United States Patent
Prevo et al.

(10) Patent No.: US 9,982,166 B2
(45) Date of Patent: May 29, 2018

(54) METAL OXIDE-POLYMER COMPOSITE PARTICLES FOR CHEMICAL MECHANICAL PLANARIZATION

(71) Applicant: Cabot Corporation, Boston, MA (US)

(72) Inventors: Brian G. Prevo, Portland, OR (US); Mark J. Hampden-Smith, Chelmsford, MA (US); Dmitry Fomitchev, Lexington, MA (US); Yakov E. Kutsovsky, Arlington, MA (US)

(73) Assignee: Cabot Corporation, Boston, MA (US)

(*) Notice: Subject to any disclaimer, the term of this patent is extended or adjusted under 35 U.S.C. 154(b) by 0 days. days.

(21) Appl. No.: 15/104,274

(22) PCT Filed: Dec. 16, 2014

(86) PCT No.: PCT/US2014/070535
§ 371 (c)(1),
(2) Date: Jun. 14, 2016

(87) PCT Pub. No.: WO2015/095154
PCT Pub. Date: Jun. 25, 2015

(65) Prior Publication Data
US 2016/0319160 A1     Nov. 3, 2016

Related U.S. Application Data

(60) Provisional application No. 61/919,251, filed on Dec. 20, 2013.

(51) Int. Cl.
C09G 1/16      (2006.01)
C09G 1/02      (2006.01)
(Continued)

(52) U.S. Cl.
CPC .............. C09G 1/16 (2013.01); B24B 37/044 (2013.01); B24B 37/245 (2013.01);
(Continued)

(58) Field of Classification Search
CPC .... C09G 1/16; C09G 1/02; C09G 1/18; C08F 130/08; C08K 3/36; C09K 3/1436;
(Continued)

(56) References Cited

U.S. PATENT DOCUMENTS 3,544,500 A    12/1970   Osmond et al.
4,421,660 A    12/1983   Solc nee Hajna
(Continued)

FOREIGN PATENT DOCUMENTS

CN    1654489 A    8/2005
EP    0104498 A2   4/1984
(Continued)

OTHER PUBLICATIONS

Notification of Transmittal of International Preliminary Report on Patentability (Chapter I of the Patent Cooperation Treaty) of International Patent Application No. PCT/US2014/031078, dated Oct. 1, 2015.
(Continued)

*Primary Examiner* — Anita K Alanko

(57) ABSTRACT

CMP processes, tools and slurries utilize metal oxide-polymer composite particles that include metal oxide particles and a polymer core. The metal oxide particles are modified with a modifying agent and are partially or fully embedded within the polymer core. Using these processes, tools and slurries can enhance removal rates, reduce defectivity and increase cleanability with respect to comparable systems and substrates.

23 Claims, 13 Drawing Sheets

(51) Int. Cl.
  *C08K 3/36* (2006.01)
  *C08F 130/08* (2006.01)
  *C09K 3/14* (2006.01)
  *B24B 37/04* (2012.01)
  *B24B 37/24* (2012.01)
  *C09G 1/18* (2006.01)

(52) U.S. Cl.
  CPC ............. *C08F 130/08* (2013.01); *C08K 3/36* (2013.01); *C09G 1/02* (2013.01); *C09G 1/18* (2013.01); *C09K 3/1436* (2013.01); *C09K 3/1445* (2013.01); *C09K 3/1463* (2013.01)

(58) Field of Classification Search
  CPC .. C09K 3/1445; C09K 3/1463; B24B 37/245; B24B 37/044
  See application file for complete search history.

(56) References Cited

U.S. PATENT DOCUMENTS

| | | | |
|---|---|---|---|
| 4,476,212 A | 10/1984 | Kakimi | |
| 4,608,401 A | 8/1986 | Martin | |
| 4,740,443 A | 4/1988 | Nakahara et al. | |
| 4,816,366 A | 3/1989 | Hyosu et al. | |
| 4,833,060 A | 5/1989 | Nair et al. | |
| 4,879,199 A | 11/1989 | Gruber et al. | |
| 4,912,009 A | 3/1990 | Amering et al. | |
| 4,960,669 A | 10/1990 | Mori et al. | |
| 4,981,882 A | 1/1991 | Smith et al. | |
| 5,135,832 A | 8/1992 | Sacripante et al. | |
| 5,494,949 A | 2/1996 | Kinkel et al. | |
| 5,783,352 A | 7/1998 | Okae et al. | |
| 5,856,055 A | 1/1999 | Ugai et al. | |
| 5,935,751 A | 8/1999 | Matsuoka et al. | |
| 5,939,471 A | 8/1999 | Watanabe et al. | |
| 6,331,373 B1 | 12/2001 | Kuramoto et al. | |
| 6,395,341 B1 | 5/2002 | Arakawa et al. | |
| 6,440,630 B2 | 8/2002 | Isobe et al. | |
| 6,447,968 B1 | 9/2002 | Ohno | |
| 6,447,969 B1 | 9/2002 | Ito et al. | |
| 6,454,819 B1* | 9/2002 | Yano | C08G 83/001 106/3 |
| 6,476,098 B1 | 11/2002 | Arakawa et al. | |
| 6,482,562 B2 | 11/2002 | Ezenyilimba et al. | |
| 6,506,529 B2 | 1/2003 | Uchida et al. | |
| 6,582,761 B1* | 6/2003 | Nishimoto | C08J 3/12 257/E21.242 |
| 6,589,703 B2 | 7/2003 | Stelter et al. | |
| 6,599,631 B2 | 7/2003 | Kambe et al. | |
| 6,756,437 B1 | 6/2004 | Xue et al. | |
| 6,818,736 B2 | 11/2004 | Shioyama et al. | |
| 6,833,401 B1 | 12/2004 | Xue et al. | |
| 7,018,768 B2 | 3/2006 | Stulc et al. | |
| 7,094,830 B2 | 8/2006 | Xue et al. | |
| 7,972,696 B2 | 7/2011 | Sandmeyer et al. | |
| 8,399,579 B2 | 3/2013 | Lohmeijer et al. | |
| 8,703,374 B2 | 4/2014 | Sweeney et al. | |
| 8,846,285 B2 | 9/2014 | Chiba et al. | |
| 8,871,844 B2 | 10/2014 | Hashemzadeh | |
| 9,120,952 B2* | 9/2015 | Gupta | C09G 1/02 |
| 9,568,847 B2* | 2/2017 | Fomitchev | G03G 9/09716 |
| 2003/0113541 A1 | 6/2003 | Yamamoto et al. | |
| 2004/0203324 A1 | 10/2004 | Smith et al. | |
| 2005/0079804 A1* | 4/2005 | Taylor | C09G 1/02 451/41 |
| 2005/0197050 A1* | 9/2005 | Prasad | B24B 37/205 451/41 |
| 2005/0238392 A1 | 10/2005 | Okamoto et al. | |
| 2007/0049164 A1* | 3/2007 | Thomson | B24B 37/245 451/5 |
| 2007/0075291 A1 | 4/2007 | Paik et al. | |
| 2008/0070146 A1 | 3/2008 | Fomitchev et al. | |
| 2009/0011352 A1 | 1/2009 | Cooper | |
| 2009/0092918 A1 | 4/2009 | Moffat | |
| 2009/0149573 A1 | 6/2009 | Venzmer et al. | |
| 2010/0104323 A1 | 4/2010 | Toizumi et al. | |
| 2010/0160491 A1 | 6/2010 | Armes et al. | |
| 2011/0070535 A1 | 3/2011 | Hosoya et al. | |
| 2011/0112251 A1 | 5/2011 | Langerbeins et al. | |
| 2011/0003130 A1 | 6/2011 | Marchet et al. | |
| 2011/0229811 A1 | 9/2011 | Saito et al. | |
| 2011/0281973 A1 | 11/2011 | Schubert et al. | |
| 2011/0287247 A1 | 11/2011 | Kawasaki et al. | |
| 2012/0322943 A1 | 12/2012 | Siol et al. | |
| 2013/0005881 A1 | 1/2013 | Yang et al. | |
| 2014/0051250 A1 | 2/2014 | Minami et al. | |
| 2014/0113226 A1 | 4/2014 | Ishii et al. | |

FOREIGN PATENT DOCUMENTS

| | | |
|---|---|---|
| EP | 0435608 A2 | 7/1991 |
| EP | 0505230 A1 | 9/1992 |
| EP | 0572128 B1 | 7/1998 |
| EP | 0930623 A1 | 7/1999 |
| EP | 1020488 A2 | 7/2000 |
| EP | 1138733 A2 | 10/2001 |
| EP | 1371672 B1 | 4/2011 |
| EP | 2386590 A1 | 11/2011 |
| GB | 2227739 A | 8/1990 |
| JP | 64009467 A | 1/1989 |
| JP | 03197963 A | 8/1991 |
| JP | 03203743 A | 9/1991 |
| JP | 04039669 A | 2/1992 |
| JP | 04273254 A | 9/1992 |
| JP | 04274251 A | 9/1992 |
| JP | 04274266 A | 9/1992 |
| JP | 04291352 A | 10/1992 |
| JP | 04291353 A | 10/1992 |
| JP | 04291354 A | 10/1992 |
| JP | 04308855 A | 10/1992 |
| JP | 05027473 A | 2/1993 |
| JP | 05127416 A | 5/1993 |
| JP | 05127426 A | 5/1993 |
| JP | 05/188634 A | 7/1993 |
| JP | 05186669 A | 7/1993 |
| JP | 05273785 A | 10/1993 |
| JP | 06011883 A | 1/1994 |
| JP | 06043686 A | 2/1994 |
| JP | 06118688 A | 4/1994 |
| JP | 07114212 A | 5/1995 |
| JP | 07219265 A | 8/1995 |
| JP | 07239569 A | 9/1995 |
| JP | 08202071 A | 8/1996 |
| JP | 08292599 A | 11/1996 |
| JP | 09054455 A | 2/1997 |
| JP | 10039536 A | 2/1998 |
| JP | 11338183 A | 12/1999 |
| JP | 2000204355 A | 7/2000 |
| JP | 2002062681 A | 2/2002 |
| JP | 2002131976 A | 5/2002 |
| JP | 2002278150 A | 9/2002 |
| JP | 2002287408 A | 10/2002 |
| JP | 2003147089 A | 5/2003 |
| JP | 2003177571 A | 6/2003 |
| JP | 2003207930 A | 7/2003 |
| JP | 2005082765 A | 3/2005 |
| JP | 2005140965 A | 6/2005 |
| JP | 2005148185 A | 6/2005 |
| JP | 2005173480 A | 6/2005 |
| JP | 2005202131 A | 7/2005 |
| JP | 2005202133 A | 7/2005 |
| JP | 2005338810 A | 12/2005 |
| JP | 2006251400 | 9/2006 |
| JP | 2007121665 A | 5/2007 |
| JP | 2007264530 A | 10/2007 |
| JP | 2008145749 A | 6/2008 |
| JP | 4189586 B2 | 12/2008 |
| JP | 4432688 B2 | 1/2010 |
| JP | 2010097201 A | 4/2010 |
| JP | 2010102167 A | 5/2010 |
| JP | 2011090168 A | 5/2011 |
| JP | 2012013776 A | 1/2012 |
| JP | 2012014114 A | 1/2012 |

(56) References Cited

FOREIGN PATENT DOCUMENTS

| | | |
|---|---|---|
| JP | 2012093630 A | 5/2012 |
| KR | 10-2010-0075253 | 7/2010 |
| WO | WO 2006/127746 A3 | 11/2006 |
| WO | WO 2008/001097 A1 | 1/2008 |
| WO | WO 2008/052216 | 5/2008 |
| WO | WO 2008/079743 A1 | 7/2008 |
| WO | WO 2008/142383 A1 | 11/2008 |
| WO | WO 2009/009010 A1 | 1/2009 |
| WO | WO 2010/074063 A1 | 7/2010 |
| WO | WO 2010/118961 A1 | 10/2010 |
| WO | WO 2011/045439 A1 | 4/2011 |
| WO | WO 2011/058051 A1 | 5/2011 |
| WO | WO 2011/119265 A1 | 9/2011 |
| WO | WO 2013/063291 A1 | 5/2013 |

OTHER PUBLICATIONS

Notification of Transmittal of the International Search Report and the Written Opinion of the International Searching Authority, or the Declaration of International Patent Application No. PCT/US2014/031078, dated Aug. 6, 2014.

Notification of Transmittal of the International Search Report and the Written Opinion of the International Searching Authority, or the Declaration of International Patent Application No. PCT/US2014/036093, dated Sep. 4, 2014.

Notification of Transmittal of International Preliminary Report on Patentability (Chapter I of the Patent Cooperation Treaty) of International Patent Application No. PCT/US2014/036093, dated Nov. 12, 2015.

Notification of Transmittal of the International Search Report and the Written Opinion of the International Searching Authority, or the Declaration of International Patent Application No. PCT/US2014/070535, dated Mar. 23, 2015.

Notification of Transmittal of International Preliminary Report on Patentability (Chapter I of the Patent Cooperation Treaty) of International Patent Application No. PCT/US2014/070535, dated Apr. 6, 2016.

Vogel, N., et al., "Platinum Nanoparticles from Size Adjusted Functional Colloidal Particles Generated by a Seeded Emulsion Polymerization Process", Beilstein Journal of Nanotechnology, 2011, vol. 2, pp. 459-472.

Fukuri, N., et al., "Control of the Morphology of Dispersed Crystalline Polyester in a Toner for Low-Energy Fusing", Journal of Imaging Science and Technology, 2011, vol. 55(1), pp. 010509-010509-8.

Chung, K., et al., "Preparation of Copoly(styrene/butyl methacrylate) Beads and Composite Particles Containing Carbon Black with Hydrophobic Silica as a Stabilizer in Aqueous Solution", Elastomers and Composites, 2012, vol. 47(1), pp. 43-53.

Schmid, et al., "Synthesis and Characterization of Film-Forming Colloidal Nanocomposite Particles Prepared via Surfactant-Free Aqueous Emulsion Copolymerization", Macromolecules 2009, vol. 42, pp. 3721-3728.

Schmid, et al., "Efficient Preparation of Polystyrene/Silica Colloidal Nanocomposite Particles by Emulsion Polymerization Using a Glycerol-Functionalized Silica Sol", Langmuir 2009, vol. 25, pp. 2486-2494.

Tourinho, et al., "Aqueous Ferrofluids Based on Manganese and Cobalt Ferrites", Journal of Materials Science, vol. 25 (1990), pp. 3249-3254.

Schmid, et al., "A New Highly Efficient Route to Polymer-Silica Colloidal Nancomposite Particles", Adv. Mater. 2008, vol. 20, pp. 3331-3336.

Percy, et al., "Surfactant-Free Synthesis of Colloidal Poly(methyl methacrylate)/Silica Nancomposites in the Absence of Auxiliary Comonomers", Langmuir 2002, vol. 18, pp. 4562-4565.

Percy, et al., "Synthesis and Characterization of Vinyl Polymer-Silica Colloidal Nanocomposites", Langmuir 2000, vol. 16, pp. 6913-6920.

Sacanna, et al., "Oil-in-Water Emulsification Induced by Ellipsoidal Hematite Colloids: Evidence for Hydrolysis-Mediated Self-Assembly", Langmuir 2007, vol. 23, pp. 9974-9982.

Sacanna, et al., "Spontaneous Oil-in-Water Emulsification Induced by Charge-Stabilized Dispersions of Various Inorganic Colloids", Langmuir 2007, vol. 23, pp. 10486-10492.

Sacanna, et al., "Thermodynamically Stable Pickering Emulsions", 2007 Phys. Rev. Lett. 98, pp. 158301-1-158301-4.

Nagao, et al., "Synthesis of Anisotropic Polymer Particles with Soap-Free Emulsion Polymerization in the Presence of a Reactive Silane Coupling Agent", Macromolecular Rapid Communications 2008, vol. 29, pp. 1484-1488.

Kraft, et al., "Evolution of Equilibrium Pickering Emulsions—A Matter of Time Scales", J. Phys. Chem. B 2010, vol. 114, pp. 12257-12263.

Kraft, et al., "Conditions for Equilibrium Solid-Stablized Emulsions", J. Phys. Chem. B 2010, vol. 114, pp. 10347-10356.

Fielding, et al., "Synthesis, Charactersation and Applications of Colloidal Nancomposite Particles", Dept. of Chemistry, The University of Sheffield, Jun. 2012, pp. 1-209.

Lee, et al., "Solid-State Nuclear Magnetic Resonance Studies of Vinyl Polymer/Silica Colloidal Nancomposite Particles", Langumuir 2010, vol. 26(19), pp. 15592-15598.

Ma, et al., "The One-Step Pickering Emulsion Polymerization Route for Synthesizing Organic-Inorganic Nanocomposite Particles", Materials 2010, vol. 3, pp. 1186-1202.

Fielding, et al., "All-Acrylic Film-Forming Colloidal Polymer/Silica Nancomposite Particles Prepared by Aqueous Emulsion Polymerization", Langmuir 2011, vol. 27, pp. 11129-11144.

Amalvy, et al., "Synthesis and Characterization of Novel Film-Forming Vinyl Polymer/Silica Colloidal Nanocomposites", Langmuir 2001, vol. 17, pp. 4770-4478.

Percy, et al., "Surface Characterization of Vinyl Polymer-Silica Colloidal Nanocomposites Using X-Ray Photoelectron Spectroscopy", J. Mater. Chem. 2002, vol. 12, pp. 697-702.

Bourgeat-Lami, et al., "Designing Organic/Inorganic Colloids by Heterophase Polymerization", Macromolecular Symp. 2007, vol. 248, pp. 213-226.

International Search Report and the Written Opinion of the International Searching Authority, or the Declaration of International Patent Application No. PCT/US2012/061957, dated Feb. 6, 2013.

Notice of Reasons for Rejection of JP Patent Application No. 2012-102057, dated Jun. 10, 2014.

Decision of Final Rejection of JP Patent Application No. 2012-102057, dated Mar. 10, 2015.

Notice of Preliminary Rejection of KR Application No. 10-2014-7010788, dated Aug. 18, 2014.

Notice of Preliminary Rejection of KR Application No. 10-2014-7010788, dated Dec. 10, 2014.

\* cited by examiner

METAL OXIDE-POLYMER COMPOSITE PARTICLES FOR CHEMICAL MECHANICAL PLANARIZATION

RELATED APPLICATIONS

This application is a national phase application of PCT/US2014/070535 filed on Dec. 16, 2014, which claims priority under 35 U.S.C. § 119(e) to U.S. Provisional Application No. 61/919,251, filed Dec. 20, 2013, the disclosure of which is incorporated herein by reference.

BACKGROUND OF THE INVENTION

Chemical mechanical planarization, also known as CMP is a technique used to planarize the top surface of an in-process semiconductor wafer or other substrates in preparation of subsequent steps or for selectively removing material according to its position. Both chemical and mechanical actions are generally involved.

CMP is commonly used in microelectronic integrated circuit (IC) fabrication. ICs are multilayered structures comprised of dielectric and conductive layers that are also patterned laterally in order to isolate different devices and functions. Each layer is deposited sequentially and then polished/removed by CMP to a desired depth prior to the deposition of the next layer in the sequence. Once a layer has been processed by CMP, it can undergo a post CMP cleaning operation that typically includes exposure (e.g., for a few minutes) at a cleaning station during which ammonium hydroxide solutions flow over a wafer surface with gentle polymer brush scrubbing action followed by forced air or infrared heat drying. Typically, the cleaning operations are followed by metrology steps to measure film thickness by either optical methods (e.g., ellipsometry) for oxide layer or by electrical impedance techniques for metallic layers (e.g., four point probe measurements).

CMP can be used to planarize a surface to nanometer and sometimes angstrom levels of smoothness in order to maximize the fidelity and quality of the pattern deposited in the next layer. CMP is necessary after nearly every material deposition step (eg. conductive metal, metal barrier, or oxide insulator layers as examples).

Removal rate is a key feature for CMP as it dictates the speed at which a given CMP step can be conducted. Also important are considerations related to workpiece defects such as those caused by scratching, dishing of metal features, oxide erosion and so forth. Since defective workpieces often need to be re-processed or discarded, their occurrence has a major impact on the costs and efficiency of the overall manufacturing process.

Typical CMP operations involve the cyclic motion of a polishing pad and a workpiece in the presence of a slurry that has abrasive and/or corrosive properties. In semiconductor manufacturing, for instance, a wafer is mounted on carrier and pressed down on a rotating platen holding a compliant polishing pad. Slurry is dispensed at the interface between wafer and pad and wafer material is removed by the combined actions of the chemical slurry and abrasive properties of the pad. The rotation of the head, coupled with the motion of the pad and its topography serves to introduce the wafer to a continuous flow of fresh slurry.

Generally, CMP polishing pads are considerably larger than the workpiece and are fabricated from polymeric materials that can include certain features, such as, for example, micro-texture for retaining the slurry on the pad. Polishing pad properties can contribute to within die (WID) thickness uniformity and within wafer (WIW) planarization uniformity. As described in U.S. Pat. No. 6,572,439, issued on Jun. 3, 2003 to Drill et al., for many CMP processes using a harder, less compressible polishing pad can lead to an increase in WID thickness uniformity but a reduction in WIW planarization uniformity, whereas a softer, more compressible pad can have the opposite effects. Such inconsistencies can be further exacerbated on larger (e.g., 300 to 450 mm) wafer scales.

With use, the working surface of the pad can become eroded. Polishing debris can get trapped in the surface micro-channels, clogging them. A conditioning or "dressing" operation can be performed (with a conditioning tool, often a diamond containing abrasive conditioning pad) to remove the glazed layer and expose a fresh polishing surface for contacting the workpiece.

CMP slurries generally contain abrasive particles, often in conjunction with other materials, in an aqueous medium. The type and properties of the abrasive can be selected by taking into account the material being planarized, desired surface finish (expressed, for example, in terms "out of flatness" or as Ra values) and other criteria. Exemplary abrasive particles that can be utilized include but are not limited to silica, alumina, ceria, zirconia, silicon carbide, and others. The abrasive particles can have characteristics that enhance slurry performance during CMP (e.g., with respect to removal rates, reliability, reproducibility or number of defects). U.S. Pat. No. 7,037,451, issued to Hampden-Smith et al. on May 2, 2006 and incorporated herein by reference in its entirety, for example, describes CMP slurries that contain abrasive particles that have a small particle size, narrow size distribution, a spherical morphology and are substantially unagglomerated.

Typical silica-containing CMP slurries use fumed silica of low surface area (90 $m^2/g$), such as Cab-O-Sil™ L-90 fumed silica (nominal specific surface area of 90 $m^2/g$), in concentrations ranging from 5 to 15 wt % or colloidal silica (also referred to herein as sol gel silica) of similar surface areas and loadings. Often higher loadings of colloidal silica slurries are required to achieve comparable CMP material removal rates. For example, in oxide or interlayer dielectric (ILD) CMP polishing, the typical loading is 10-12% wt for fumed silica in the slurry. By comparison, typical colloidal silica loadings for comparable ILD polishing slurries would be 25-30% wt (e.g. for example, Klebesol 1501 silica slurry).

The concentration and size of the particle largely dictates the removal rate, particularly for ILD CMP steps. Lower specific surface area particles (e.g. larger diameter particles) provide an advantage over other smaller particles (higher surface area) in terms of removal rate. However, defectivity (often expressed as the number of scratches) also increases with particle size and can reduce device yield by ultimately causing chip failures that are not detected until fabrication is completed. While decreasing the loading of particles can reduce defectivity, it also reduces removal rate, since removal rate scales with particle loading. Rate accelerating chemistry packages, sometimes called accelerators, added to the slurry can help augment removal rate, allowing the usage of smaller particles and reduced loadings to match removal rate and reduce defectivity. Smaller particles, however, are also more difficult to detect during post CMP metrology steps (e.g. defectivity measurements), and they are more difficult to remove by cleaning operations that follow CMP. These residual particles pose the threat of greater defectivity and lost yield, as subsequently deposited layers in the IC architecture trap the defect residual particle, which can ultimately cause performance issues in the final product. The size of the primary particle in a fumed aggregate or colloidal particle can also influence removal rate.

SUMMARY OF THE INVENTION

To address advances in electronic components, increasingly complex demands are being placed on CMP processes, materials and equipment utilized to planarize semiconductor, optical, magnetic or other types of substrates. A need continues to exist for CMP slurries and pads that can provide good removal rates, good WIW planarization uniformity, good WID thickness uniformity, low dishing and/or erosion, reduced scratching and residual particle debris, lowered conditioning requirements, prolonged service life, coupled with good selectivity and easy cleanability to help break some of the performance tradeoffs described above.

It has been discovered that certain inorganic oxide-polymer composite particles comprised of a polymer core and inorganic (typically metal oxide) particles (also referred to herein as particulates) that are bound or embedded in its surface provide a way to combine the benefits of large and small sizes as well as softer and harder materials in a single composite particle that can be formulated into a slurry to help break CMP performance tradeoffs. Process benefits are also expected for CMP polishing pads that incorporate such composite particles.

For example, metal oxide-polymer composite particles can break the removal rate/defectivity trade-off described above for metal oxide abrasive particles. The actual abrasive components of the composite particles will have similar contact areas as when the constituent metal oxide particles are used alone (i.e., not incorporated into a composite). Additionally, the larger composite particles will have multiple abrasive contact points per particle; hence, removal rate per loading should match or exceed previous levels. Removal rates measured by film thickness or mass loss should be improved by 0-25%, or perhaps as much as 0-50%, for comparable systems and substrates.

Metal oxide-polymer composite particles also provide a significant benefit in reduced defectivity. Without being bound by any particular theory, it is expected that the reduced modulus of the polymer core relative to the metal oxide coupled with the multiple, smaller metal oxide contact points during CMP will relieve points of excessive pressure upon the substrate which should also reduce scratch-like defectivity. It is anticipated that defectivity counts measured by known post CMP metrology tests could be reduced by 10-90%.

Moreover, the larger composite particles can facilitate post CMP cleaning (relative to the metal oxide particles alone) as they will present a larger hydrodynamic diameter and viscous drag to cleaning media, while reducing adhesion to the substrate. The abrasive contact points will also lift the center of mass (of the composite particles) upward with respect to the surface being polished, reducing the contact area per volume of composite particle, thus facilitating removal during post-CMP cleaning. Additionally, because the particles are a composite of polymeric and metal oxide materials, the net density of the particles is lower than that of the pristine colloidal metal oxide components, further improving their ability to remain stable in dispersion, and reducing their resistance to changes in direction via fluid convection or inertia. Thus residual particle counts on the work surface as measured by post CMP microscopy or profilometry could be reduced by 20-100%.

Another feature of importance to CMP processing is the ability to vary the composition of these polymer/inorganic composite abrasive materials in order to provide improve selectivity towards certain layers. For example, various metal oxides other than, or in addition to silica may be used as selective components. Non-limiting examples include alumina, titania, ceria, zirconia, tin oxides, mixed metal oxides, and other mineral materials, as well as any combinations thereof.

Inorganic materials or particles can be selected to offer increased hardness, increased removal rate, improved selectivity to removing certain substrates such as surface nitrides, metals, metal barrier layers, or oxides relative to the other surface layers being polishing by CMP, or other benefits. In some instances, composite particles are advantageous as they reduce the net volume of exotic materials performing the actual CMP abrasive process, which could be important for expensive and somewhat rare metal oxides like ceria. Additionally, in the case of alumina, which is harder and more abrasive than silica, particularly when in the alpha crystalline phase, this may be a way of providing enhanced removal rate while alleviating defectivity, by virtue of dissipating the forces leading to excessive scratching as described above. For inorganic metal oxide abrasive particles, at a fixed removal rate, the mass loading of that abrasive component utilized in a composite particle slurry is expected to be reduced by 10-60% relative to metal oxide abrasives alone in slurries because the abrasive can be bound to the periphery of a core particle that occupies a larger volume, thereby more effectively distributing and utilizing the inorganic materials. Additionally, the reduced density of the organic core relative to the inorganic materials embedded in its surface will reduce the net density of the composite particles relative to the inorganic abrasive materials. Thus, reduced mass loadings of the composite abrasives may yield equivalent or greater removal rates to with respect to the corresponding abrasive-only slurry compositions.

In specific aspects, the invention relates to the use of composite particles in slurries and/or tools designed for CMP operations. The composite particles are comprised of metal oxide particles and a polymer core and may contain additional ingredients that play a role in CMP performance. Typically, the metal particles are modified with a modifying agent and are partially or fully embedded within the polymer core.

In other aspects, the invention relates a process for removing material from a substrate through chemical and abrasive actions, such as a CMP process. The process comprises: removing material from a substrate with a polishing pad or slurry composition, wherein the polishing pad, or the slurry composition, or both include metal oxide-polymer composite particles that comprise metal oxide particles and a polymer core, to produce a processed surface. Typically, the metal oxide particles are modified with a modifying agent, and a portion of the metal oxide particles are partially or fully embedded within the polymer core.

Materials and methods described herein can be used not just in CMP processes and equipment but also in the polishing of other surfaces such as glass, ceramics, dental materials, solar panel components, and so forth.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
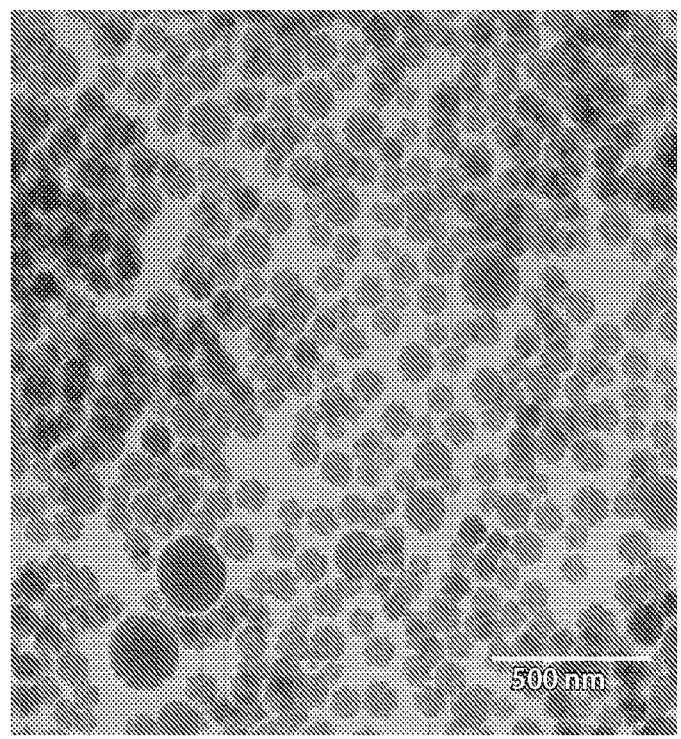
FIGS. 1 and 2 are transmission electron micrographs of metal oxide-polymer composite particles that can be used in various embodiments of the invention.

Embodiments described herein relate to metal oxide-polymer composite particles. In various implementations, the composite particles are used in processes, compositions or equipment for the removal of material from a workpiece, through a combination of chemical and abrasive actions, such as, for example, chemical mechanical planarization (CMP). The composite particles also can be utilized in polishing operations, materials and/or equipment suitable for polishing various materials such as glass, ceramic, dental materials, solar panels or components thereof, optical surfaces, photovoltaics or components thereof, and others.

The composite particles can be thought of as having a polymer core and inorganic oxide particles, also referred to herein as "particulates," that are bound to or embedded in its surface. In some implementations, inorganic oxide particulates or another inorganic material, or both are also present within (either partially or entirely embedded within) the polymer core.

Examples of inorganic oxides that can be employed include metal oxides such as, for example, silica, alumina, ceria, molybdenum oxide, titania, zirconia, zinc oxide, iron oxides, including but not limited to magnetite ($Fe_3O_4$) and various forms of $Fe_2O_3$, niobium oxide, vanadium oxide, tungsten oxide, tin oxide, barium oxide, calcium oxide, magnesium oxide, strontium oxide, phosphorous oxides, mixtures of any of these, or mixed oxides of any two or more of these.

Suitable particulates include but are not limited to precipitated, colloidal, and pyrogenic metal oxide particles. The metal oxide particles may be produced utilizing techniques known to those skilled in the art including gas phase flame synthesis, or "wet" aqueous or solvothermal sol-gel chemistry routes and more.

Precipitated metal oxide particles may be manufactured utilizing conventional techniques and are often formed by the coagulation of the desired particles from an aqueous medium under the influence of high salt concentrations, acids, or other coagulants. The metal oxide particles are filtered, washed, dried, and separated from residues of other reaction products by conventional techniques known to those skilled in the art. Precipitated particles are often aggregated in the sense that numerous primary particles coagulate to one another to form a somewhat spherical aggregated cluster. Non-limiting examples of commercially available precipitated metal oxides include Hi-Sil® products from PPG Industries, Inc. and SIPERNAT® products available from Evonik Industries AG.

Alternative metal oxide morphologies may be obtained using the methods disclosed in U.S. Pat. Nos. 4,755,368, 6,551,567, and 6,702,994, US Patent Publication No. 20110244387, in Mueller, et al., "Nanoparticle synthesis at high production rates by flame spray pyrolysis," *Chemical Engineering Science*, 58: 1969 (2003), and in Naito, et al., "New Submicron Silica Produced by the Fumed Process," published in NIP 28: International Conference on Digital Printing Technologies and Digital Fabrication 2012, 2012, p. 179-182, the contents of all of which are incorporated by reference. These methods typically result in metal oxide particles with low structure and surface area. Many of these particles are pyrogenic, that is, they are produced in a flame. Other methods of producing pyrogenic particles are disclosed, for example, in Kodas and Hampden-Smith, *Aerosol Processing of Materials*, Wiley-VCH, 1998.

The production of a fumed metal oxide is a well-documented process which involves the hydrolysis of suitable feed stock vapor (such as aluminum chloride for a fumed alumina, or silicon tetrachloride for fumed silica) in a flame of hydrogen and oxygen. Molten particles of roughly spherical shape are formed in the combustion process, and the particle diameters may be varied through control of process parameters. These molten spheres, referred to as primary particles, fuse with one another by undergoing collisions at their contact points to form branched, three dimensional chain-like aggregates. The formation of the aggregates is considered to be irreversible as a result of the fusion between the primary particles. During cooling and collecting, the aggregates undergo further collisions that may result in some mechanical entanglements to form agglomerates. These agglomerates are thought to be loosely held together by van der Waals forces and can be reversed, i.e. de-agglomerated, by proper dispersion in a suitable media. Mixed or co-fumed metal oxide particles may also be produced utilizing conventional techniques known to those skilled in the art including, for example, those described in GB 2296915A to Ettlinger et al., the specification of which is incorporated herein in its entirety by reference.

Non-limiting examples of fumed metal oxide particles include CAB-O-SIL® fumed silica and SpectrAL™ fumed alumina products available from Cabot Corporation, HDK® fumed silica products available from Wacker Chemie AG, and AEROSIL® fumed silica and AEROXIDE® fumed alumina and titania products available from Evonik Industries. Fumed metal oxides are also commercially available in dispersed form, for example, including CAB-O-SPERSE® products available from Cabot Corporation and AERO-DISP® products available from Evonik Industries. In some embodiments, pyrogenic metal oxides for use in the composite particles provided herein are small, e.g., with volume average diameters less than 100 nm.

Colloidal metal oxide particles (also referred to herein as "sol gel" metal oxide particles) are often non-aggregated, individually discrete (primary) particles, which typically are spherical or nearly spherical in shape, but can have other shapes (e.g., shapes with generally elliptical, square, or rectangular cross-sections). Colloidal metal oxides are commercially available or can be prepared by known methods from various starting materials (e.g., wet-process type metal oxides). Colloidal metal oxide particles are typically fabricated in a manner similar to precipitated metal oxide particles (i.e., they are coagulated from an aqueous medium) but remain dispersed in a liquid medium (often water alone or with a co-solvent and/or stabilizing agent). Metal oxide particles can be prepared, for example, from silicic acid derived from an alkali silicate solution having a pH of about 9 to about 11, wherein the silicate anions undergo polymerization to produce discrete silica particles having the desired average particle size in the form of an aqueous dispersion. Typically, the colloidal metal oxide starting material will be available as a sol, which is a dispersion of colloidal metal oxide in a suitable solvent, most often water alone or with a co-solvent and/or stabilizing agent. The resulting colloidal particles are frequently termed sol-gel particles, and the two terms are used interchangeably below. See, e.g., Stoeber, et al., "Controlled Growth of Monodisperse Silica Spheres in the Micron Size Range," *Journal of Colloid and Interface Science,* 26, 1968, pp. 62-69, Akitoshi Yoshida, Silica Nucleation, Polymerization, and Growth Preparation of Monodispersed Sols, in *Colloidal Silica Fundamentals and Applications*, pp 47-56 (H. E. Bergna & W. O. Roberts, eds., CRC Press: Boca Raton, Fla., 2006), and Iler, R. K., *The Chemistry of Silica*, p 866 (John Wiley & Sons: New York, 1979). Non-limiting examples of commercially available colloidal metal oxides that can be used include SNOWTEX® products from Nissan Chemical, LUDOX® products available from W.R. Grace & Co., NexSil™ and NexSil A™ series products available from Nyacol Nanotechnologies, Inc., Quartron™ products available from Fuso Chemical, and Levasil® or Bindzil® products available from AkzoNobel. Exemplary commercially available titania particles made by "wet" synthesis include STR100N and STR100A titanium dioxide from Sakai Chemical.

Sol gel metal oxide particles may have a primary particle size from about 5 to about 100 nm, for example, from about 5 to about 10 nm, from about 10 to about 20 nm, from about 20 nm to about 30 nm, from about 30 to about 50 nm, or from about 50 to about 70 nm. The metal oxide particles may be spherical or non-spherical. For example, the aspect ratio of the metal oxide particles may be from about 1.5 to about 3, for example, from about 1.5 to about 1.8, from about 1.8 to about 2.1, from about 2.1 to about 2.5, from about 2.5 to about 2.8, or from about 2.8 to about 3. Particle size may be measured by dynamic light scattering.

The metal oxide particles (or other inorganic particulates employed in the formation of the composite particles described herein) can be treated to change their surface chemistry and/or functionality. For example, metal oxide particles or other inorganic particulates can be treated to enhance their material removal properties during CMP, to alter their reactivity towards specific species in the workpiece, to change the hydrophilic or hydrophobic character of the surface, and so forth. The treatment can take place before, during or after the formation of the metal oxide-polymer composite particles.

In some embodiments, metal oxide particles such as silica particles are treated with organic and/or inorganic modifiers to enhance, for instance, the chemical aspect of material removal in the CMP process. Suitable inorganic surface reactive groups include but are not limited to metal phosphates, nitrates, other metal oxides such as ceria or cerium ions and so forth. Phosphates, for example, are thought to adhere to the silica portion of the composite particle, and enable increased reactivity to the substrate. Metal oxides can be added to the surface of silica particles in the composite particle by deposition in a solution of metal alkoxides that can be hydrolyzed and condensed on the existing metal oxide surface (e.g. titanium tetraisopropoxide reacts to yield and nucleate titania). These can complex with other metals or metal oxides that are present in the substrate being polished, and when the composite particle moves from one portion of the substrate to another, it removes a small portion of the substrate.

In other embodiments, the surface of the metal oxide particles is modified through covalent reactions with the surface functional groups (OH in the case of a colloidal metal oxide such as silica) to render the surface chemically active towards a specific chemistry in the substrate surface to achieve chemical selectivity. This can allow a more extensive range of chemistry in a CMP slurry that otherwise might not be economically viable: whereas reagents may be prohibitively expensive as a bulk ingredient, they can be cost effective when used as a surface layer. Modifying the surface of metal oxide particles through covalent reactions with surface functional groups (such as, for instance OH groups) could also prevent over etching by providing a specific concentration of the chemical reagent on the surface. Thus once this concentration of chemical reagent is consumed, the etching process is terminated. Ceria, alumina, phosphates are some examples of the type of chemically active coatings that can be provided on a silica or other metal oxide surface.

In yet other embodiments, the metal oxide particles are modified with a modifying agent via which the metal oxide particles are covalently attached to the polymer in the polymer core. The resulting metal oxide particles can be further treated, e.g., with one or more additional modifying agent(s). The compound via which metal oxide particles are covalently attached to the polymer, also referred to herein as the first modifying agent, can be bifunctional, including a first reactive group that can covalently attached to the metal oxide particle and a second reactive group that can be incorporated into the polymer of the metal oxide-polymer composite particle.

If additional modifying agents are utilized, a second modifying agent may be, for example, a charge modifying agent. Any of the charge modifying agents disclosed in U.S. Patent Publication No. 2010/0009280, the contents of which are incorporated herein by reference, may be employed herein. Exemplary charge modifying agents include but are not limited to 3-(2,4-dinitrophenylamino) propyltriethoxsilane (DNPS), 3,5-dinitrobenzamido-n-propyltriethoxysilane, 3-(triethoxysilylpropyl)-p-nitrobenzamide (TESP-NBA), pentafluorophenyltriethoxysilane (PFPTES), and 2-(4-chlorosulfonylphenyl)ethyltrimethoxysilane (CSPES).

The degree of surface treatment of the metal oxide with the first modifying agent may be controlled by adjusting the pH and/or the temperature of the initial solution. The rate of adsorption of the first modifying agent onto the metal oxide particles (which adsorption is followed by the formation of a siloxane bond between the surface and the agent) may also be controlled by the choice of the leaving group on the silane, e.g., ethoxy tends to hydrolyze more slowly than methoxy.

Depending on the interaction between the second modifying agent (when used after formation of the metal oxide-polymer particle) and/or a third modifying agent and the polymer component of the metal oxide-polymer composite particles, these agents may also surface treat the exposed polymer surface of the metal oxide-polymer composite particles.

In addition to inorganic (metal) oxide particles, the composite particles described herein contain a polymer. Typically the polymer, alone or in combination with one or more other materials, e.g., inorganic materials, as further described below, forms the "core" of the composite particles.

The polymer employed in the metal oxide-polymer composite particles may be the same or different as the polymer of the first modifying agent. That is, where the first modifying agent includes a polymerizable group, the same material may simply be used to form the polymer.

In certain implementations, the polymer of the first modifying agent is not a polyether. Alternatively or in addition, the polymer of the first modifying agent is an acrylate or methacrylate polymer. Alternatively or in addition, a different monomer or a cross-linking agent that can copolymerize with the terminal group on the first modifying agent may be employed.

Suitable monomers that may be used to produce the metal oxide-polymer composite particles include substituted and unsubstituted vinyl and acrylate (including methacrylate) monomers and other monomers that polymerize by radical polymerization. Exemplary substitutions include but are not limited to alkyl and halo, for example, fluoro. Exemplary monomers include styrene, acrylates and methacrylates, olefins, vinyl esters, and acrylonitrile and are easily available to those of skill in the art, for example, from Sigma-Aldrich (Milwaukee, Wis.). Such monomers may be used by themselves, in mixtures to form copolymers, or in conjunction with cross-linking agents.

Exemplary cross-linking agents include divinyl terminated versions of the first modifying agent (e.g., with the silane replaced by a vinyl group) or other well-known vinyl cross-linking agents, such as divinyl benzene and ethylene glycol dimethacrylate. Alternatively or in addition, the co-monomer or cross-linking agent may react with the silane. For example, silanol-terminated siloxane polymers or a suitable copolymer may be used in conjunction with the first modifying agent. The co-monomer or cross-linking agent may be added at the same time or at a different time than the first modifying agent. The amount of cross-linking agent may be adjusted to control the degree of cross-linking in the final polymer.

The metal oxide-polymer composite particles can be prepared by creating an emulsion of an organic phase comprising the first modifying agent and optional monomer and an aqueous phase in which the metal oxide particles are primarily disposed at the interface between the two fluid phases. Polymerization of the polymerizable species in the organic phase results in the composite particles. In one exemplary procedure, an emulsion is prepared with the first modifying agent and optional co-monomers and cross-linking agents and metal oxide particles at a ratio of about 1.5 to 8.0 by mass (polymerizable species: metal oxide) in aqueous media, e.g., water with an optional co-solvent such as an alcohol, e.g., isopropyl alcohol. The total amount of metal oxide particles and polymerizable species in the emulsion may be from about 5 wt % to about 25 wt %, for example from 5 wt % to about 15 wt %, from about 15 wt % to about 22 wt %, or from about 18 wt % to about 25 wt %. The pH is optionally brought to about 8.0-10 and the dispersion is stirred to form an emulsion (typically 1-3 hours) while the temperature is maintained at 25-60° C.

Following stirring, an initiator is introduced as a solution in ethanol, acetone, or other water-miscible solvent at a level of about 1 to about 4 wt % with respect to monomer. Suitable initiators include but are not limited to oil soluble azo or peroxide thermal initiators such as 2,2'-azobis(2-methylpropionitrile) (AIBN), benzoyl peroxide, tert-butyl peracetate, and cyclohexanone peroxide. A variety of suitable initiators are available from Wako Pure Chemical Industries, Ltd. (Osaka, Japan). The initiator may be dissolved in the monomer prior to the introduction of the metal oxide. The resulting solution is incubated at 65-95° C. with stirring for 4-6 hours. The resulting slurry is dried at 100-130° C. overnight and the remaining solid is milled to produce a powder. Where a second modifying agent is added after formation of the metal oxide-polymer composite, it may be introduced before the drying step. For example, the second modifying agent may be added and the slurry stirred for an additional 2-4 hours with incubation at 60-75° C.

The amount of metal oxide exposed at the surface of the metal oxide-polymer composite may vary depending on the amount of time the metal oxide particles are exposed to the first modifying agent, such as, for instance, a hydrophobizing agent, before the initiator is activated. The metal oxide particles in the emulsion are distributed at the surface of micelles, or droplets, comprising the first modifying agent. Without being bound by any particular theory, it is believed that, as the first modifying agent adsorbs onto and becomes attached to the metal oxide surface, that the metal oxide particle becomes more hydrophobic and gradually exposes a higher proportion of its surface to the interior of the droplet of first modifying agent, i.e., by sinking into the droplet to expose less surface to the aqueous continuous phase of the emulsion. Once polymerization is complete, the metal oxide particles are fixed in place. If a second modifying agent is used, the degree of treatment may provide an additional handle for controlling the exposure of the metal oxide particle at the surface of the metal oxide-polymer composite. The amount of the surface (area) of the metal oxide particles that is exposed at the surface of the metal oxide-polymer composite particles may be influenced by the degree of the surface treatment process being performed. The mixture of the first modifying agent, e.g., a hydrophobizing agent, and an aqueous solution forms an emulsion that is stabilized by the migration of metal oxide particles to the surface of droplets of the first modifying agent. As the silane hydrolyzes and adsorbs onto the metal oxide surface, the originally hydrophilic surface becomes more hydrophobic and thus more compatible with the organic phase, gradually migrating from the aqueous side of the organic/aqueous interface to the organic side. Thus, controlling the degree of surface treatment of the metal oxide before polymerization also controls the amount of metal oxide at the surface of the resulting metal oxide-polymer composite particle.

Variables such the pH of the aqueous phase of the emulsion and the incubation temperature may influence the morphology of the composite particle.

In some implementations, inorganic particulates are present within (entirely embedded within) the polymer core. In other implementations, the composite particles have metal oxide particles disposed within the core, i.e., completely embedded within the polymer phase, as well as protruding from the core surface. Metal oxide particles and/or additional inorganic material distributed within the core can contribute to the mechanical reinforcement of the composite particles, increasing their compressive strength. Composite particles in which the core includes a polymer as well as one or more inorganic particles of different chemical composition that typically are entirely embedded within the polymer phase can be thought as having a "hybrid" core. In addition or alternatively to the metal oxide particles described above, inorganic materials that can be present within the core include but are not limited to metal oxides, metal carbides, carbonates, titanates, silicates, phosphates, borates and others. In a specific example, the same metal oxide particles are protruding at the surface of the polymer-metal oxide composite and are also disposed within the core (100% embedded). In another example, the metal oxide particles described above are present at the core surface while the core can contain inorganic particles that are different from the surface metal oxide particles. In further examples, mixtures of metal oxide particles can be present within the core and/or at the core surface.

Metal oxide-polymer composite particles suitable for CMP applications may be designed by considering one or more of the following criteria: the diameter of the core; the diameter of the metal oxide particle; core composition; composition of the metal oxide particles; surface area of the core "covered" by metal oxide particles; the extent to which metal oxide particles protrude from the core surface; the surface chemistry of the core and/or metal oxide particles; whether the core is polymer phase only or hybrid, and others.

The metal oxide-polymer composite particles will typically be round. It will be understood that the particles need not be spherical but will typically have a "bumpy" surface depending on the degree to which the metal oxide particles are exposed or embedded at the surface of the composite particle. The metal oxide-polymer composite particles may have an aspect ratio of about 0.8 to about 1.2, for example, about 0.85 to about 0.90, about 0.90 to about 0.95, about 0.95 to about 1.0, about 1.0 to about 1.05, about 1.05 to about 1.1, or about 1.1 to about 1.15. In some cases, the metal oxide-polymer composite particles have shapes that are elongated (ovoid, peanut-shaped, etc.) or irregular and can have larger aspect ratios, e.g., about 1.2 to about 1.4, about 1.4 to about 1.6, about 1.6 to about 1.8, about 1.8 to about 2.0 and higher.

The degree of "bumpiness," or roughness, of the metal oxide-polymer composite particles may be determined by TEM (transmission electron microscope) evaluation. Conventional image analysis software is used to define a perimeter P of a cross-section of the particle. The same software is used to calculate particle cross-sectional area S. These measurements are made for multiple particles on multiple TEM images. Particle Roughness is equal to $P^2/4\pi S$ (John C. Russ, *The Image Processing Handbook*, CRC Press, 4$^{th}$ edition, 2002). The roughness of an ideal spherical particle is 1.0. The roughness of a typical non-aggregated colloidal silica is about 1.3. The average roughness of the metal oxide-polymer composite particles may be from 1 to about 3, for example, from 1 to about 1.5, from about 1.5 to about 2, from about 2 to about 2.5, or from about 2.5 to about 3, e.g. from about 1.1 to about 1.5 or from about 1.2 to about 1.4. The average roughness is measured using images of at least 200 particles, preferably at least 500 particles.

TEM images may also be used to evaluate the degree to which the inorganic particles protrude from the surface of the metal oxide-polymer composite particles. For example, the inorganic particles may have from 0 to about 10% of their diameter or length protruding from the particle, from about 10% to about 20%, from about 20% to about 30%, from about 30% to about 40%, or from about 40% to about 50% of their diameter or length protruding from the polymer surface.

Alternatively or in addition, the same image analysis software may be used to construct a convex hull about the image of the particle and determine the area C inside the hull, termed "hull area". A convex hull is a curved convex bounding surface enclosing the entire particle. It is generated by moving a pair of parallel lines until they just touch the exterior of the particle image. The angle of the parallel lines is then changed and the process repeated until the entire path of the convex hull is defined. The relative trough area (RTA), is defined by (C-S)/S, where S is the particle cross-sectional area described in connection with roughness. The value of RTA increases with increasing protrusions from the surface. The RTA of a perfect sphere is 0. The RTA of a typical non-aggregated colloidal silica is about 0.01. The average RTA of the metal oxide-polymer composite particles may be from 0 to about 1, for example from 0 to about 0.1, e.g., about 0.01 to about 0.02, about 0.02 to about 0.03, about 0.03 to about 0.04, about 0.04 to about 0.05, about 0.05 to about 0.06, 0.06 to about 0.07, about 0.07 to about 0.08, about 0.08 to about 0.09, or about 0.09 to about 0.1. The average RTA is measured using images of at least 200 particles. Of course, using more particle images will provide greater sensitivity and facilitate distinguishing different particle morphologies.

Brunhauer-Edmond-Teller (BET) isotherms of nitrogen may also be used to measure the specific surface area per gram of a sample quantity of dry composite particle powder. Because the size of the core and the size of the decorative satellite particles are known, and their relative amounts are known from synthesis, the measured specific surface area can provide a single average measure of the degree of average protrusion of inorganic particles from the polymer core for millions or billions of particles. Thus, for a given polymer core particle size or composite particle size or diameter as measured by TEM, dynamic light scattering or other means, the increase or decrease in specific surface area can be directly correlated to the relative bumpiness or protrusion of the decorative surface inorganic particles.

Figure 2:
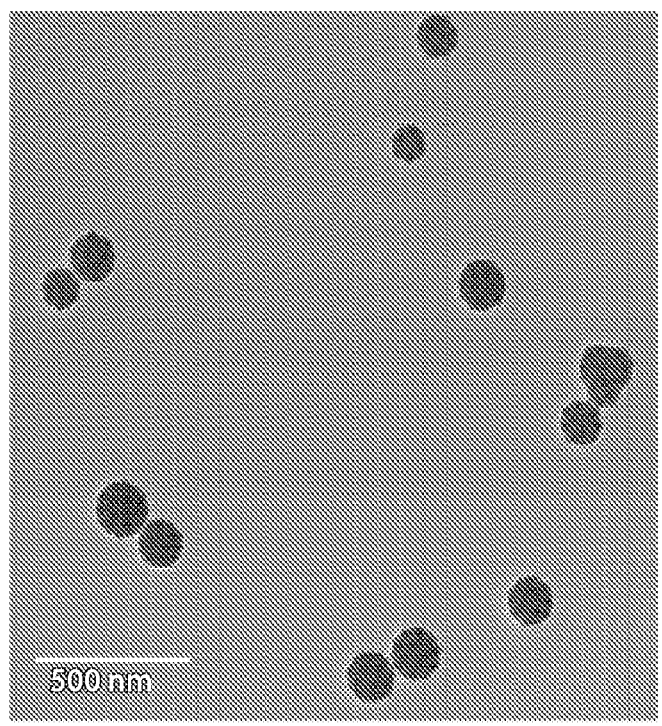
Figure 3:
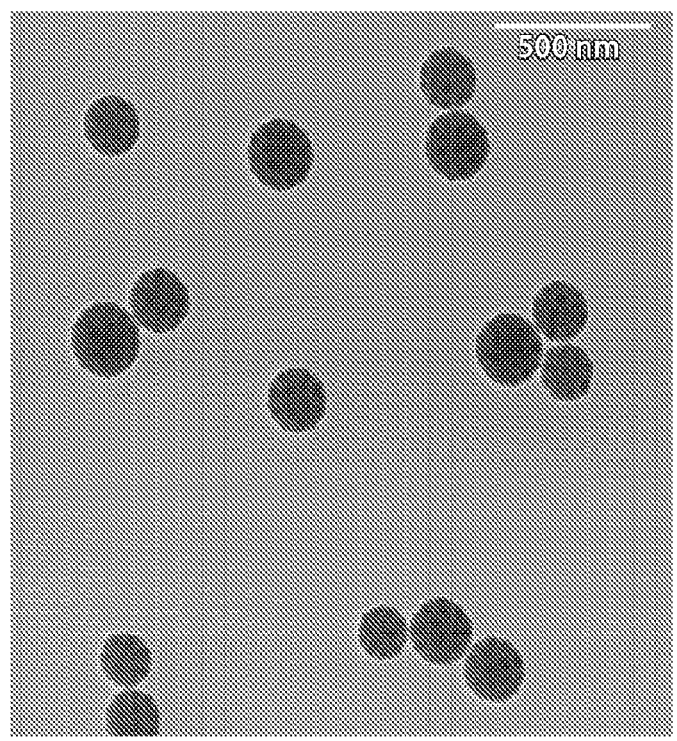
FIGS. 3-5 are transmission electron micrographs of metal oxide-polymer composite particles that can be used in various embodiments of the invention.
Figure 4:
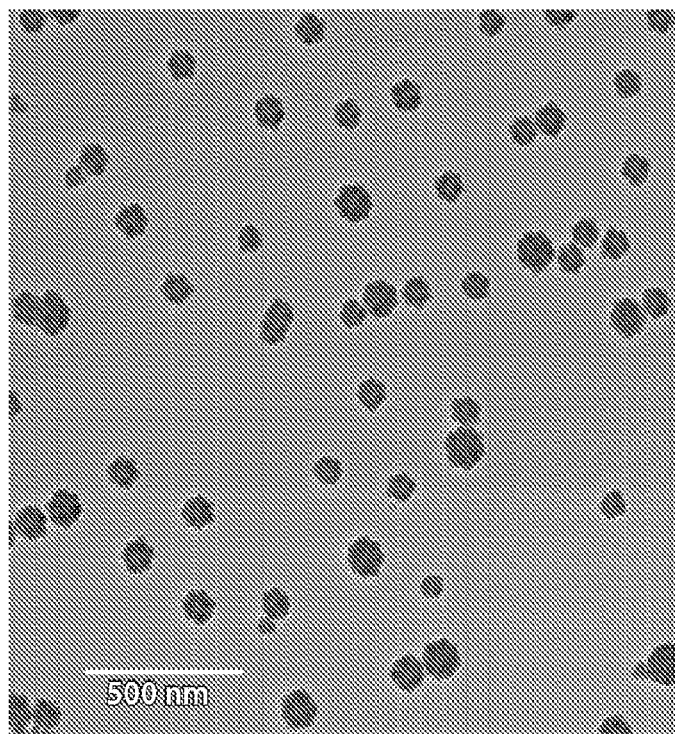
Figure 5:
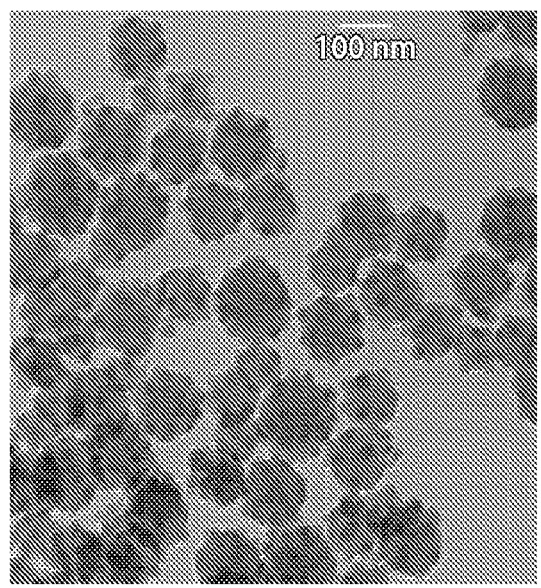
Figure 6:
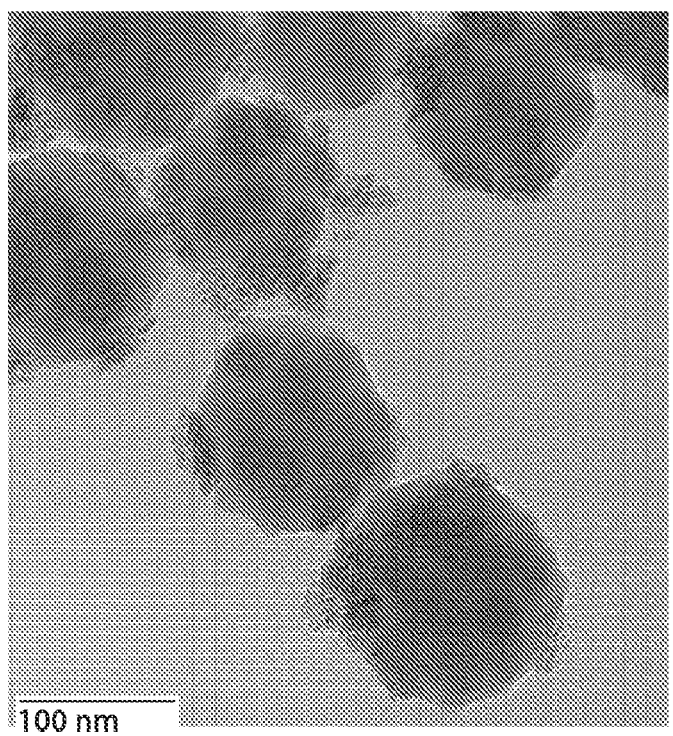
FIG. 6 is a transmission electron micrograph of metal oxide-polymer composite particles that can be used in various embodiments of the invention.
Figure 7:
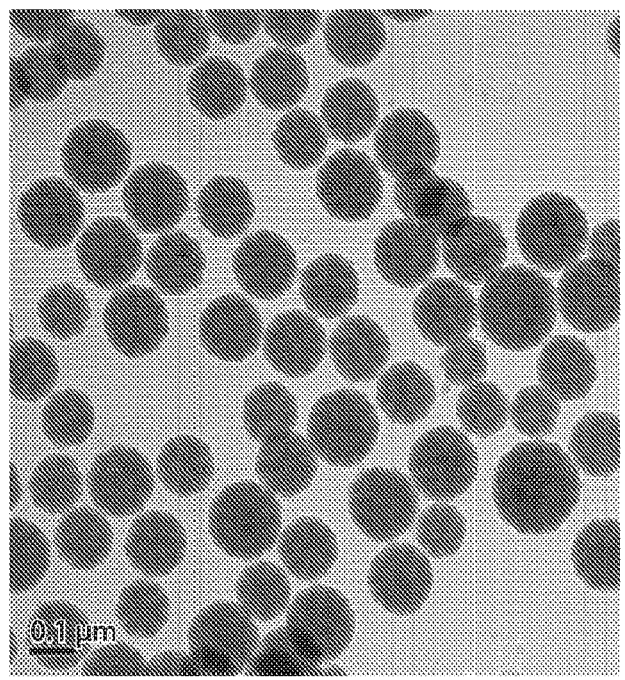
FIGS. 7-11 are transmission electron micrographs of metal oxide-polymer composite particles that can be used in various embodiments of the invention.
Figure 8:
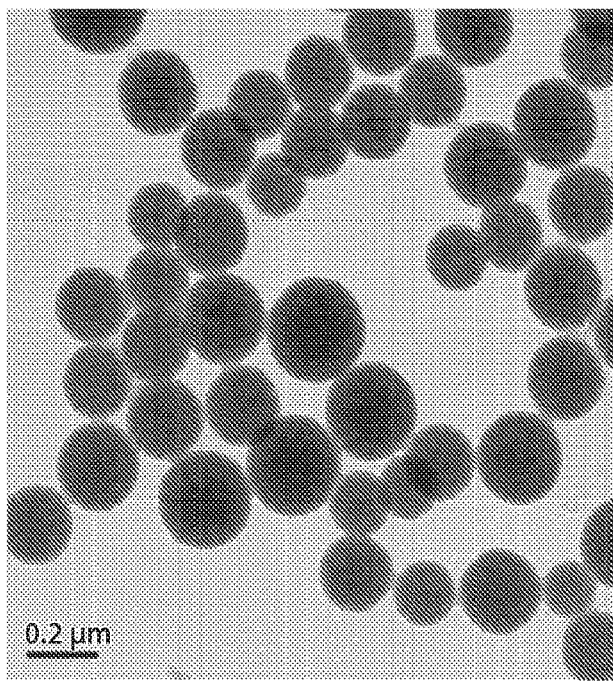
Figure 9:
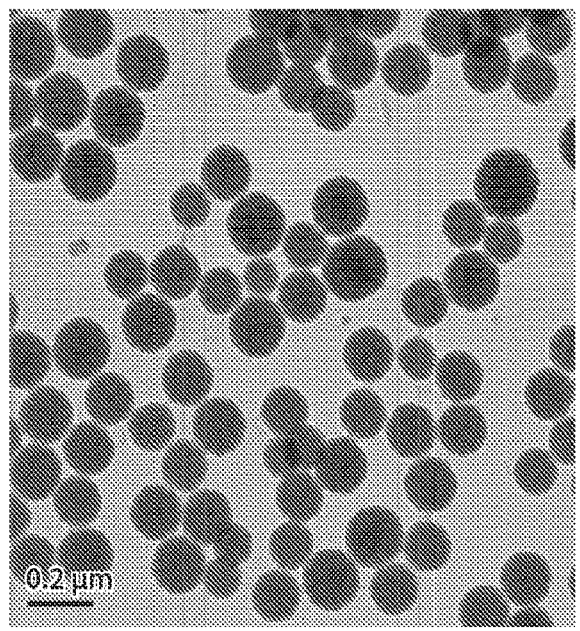
Figure 10:
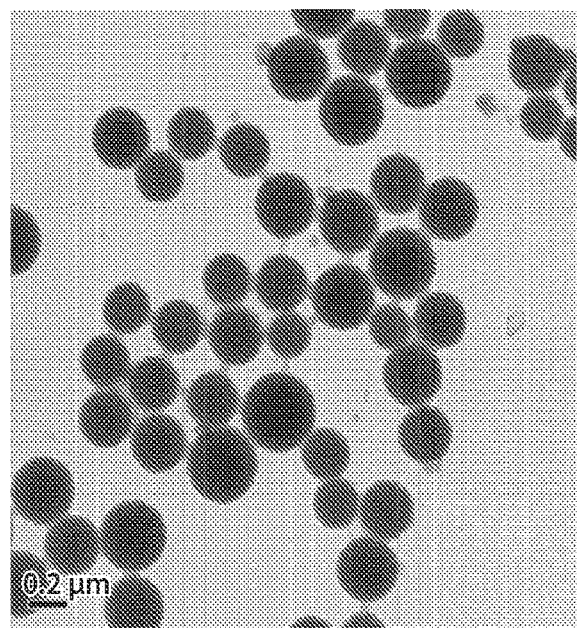
Figure 11:
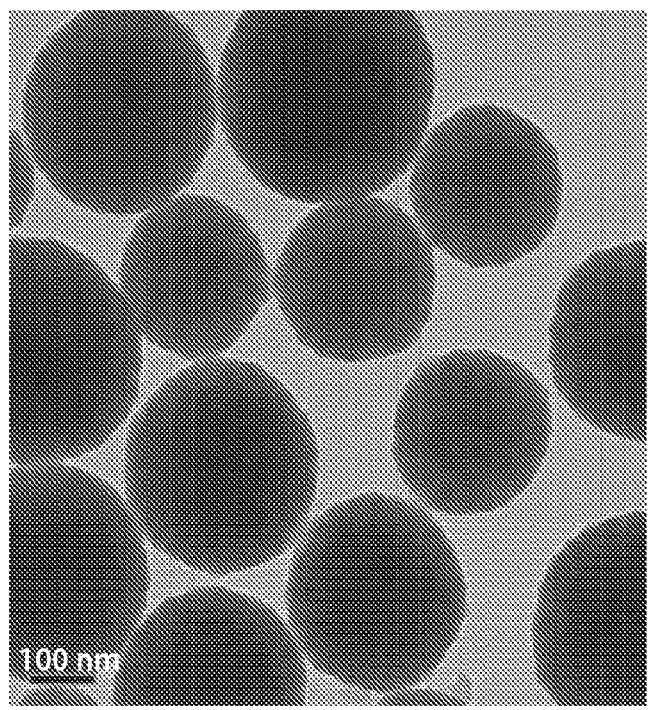
Figure 12A:
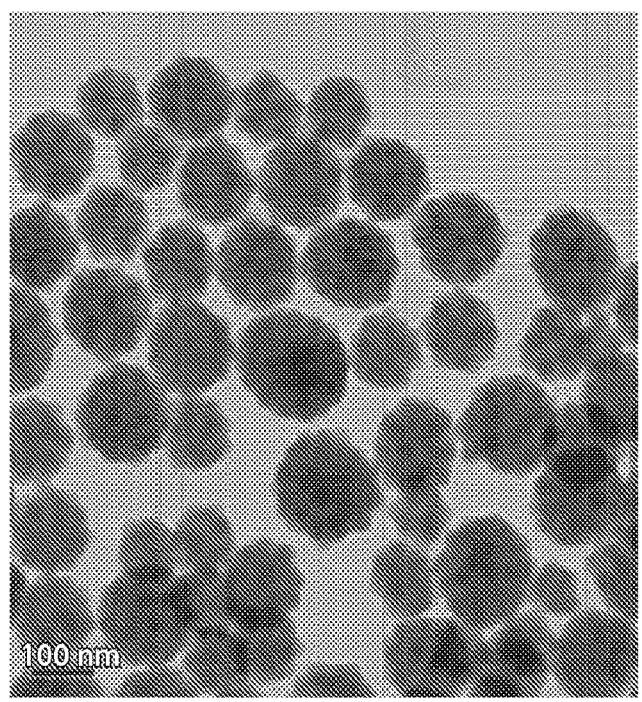
FIGS. 12A and 12B are transmission and scanning electron micrographs, respectively, of metal oxide-polymer composite particles that can be used in various embodiments of the invention.
Figure 12B:
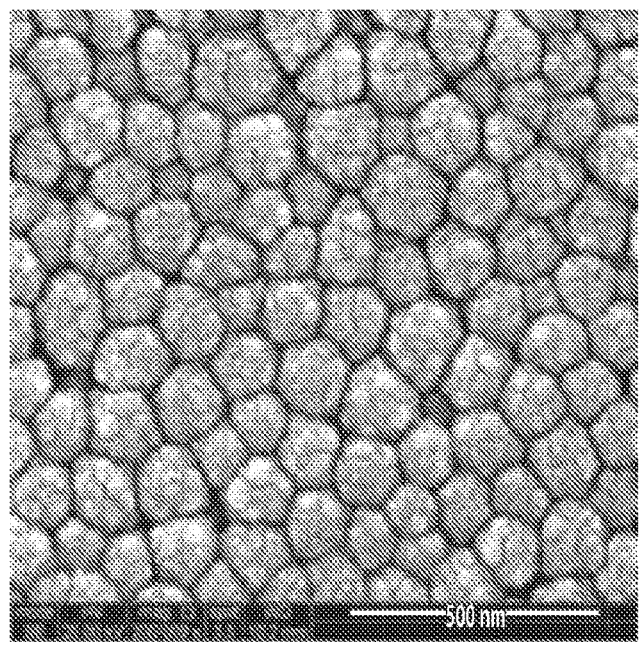

Transmission electron micrographs of exemplary composite particles prepared according to principles described herein and suitable for use in CMP applications are provided in FIGS. 1 through 11. FIGS. 12A and 12B are transmission and scanning electron micrographs, respectively, of metal oxide-polymer composite particles that can be used in various embodiments. Specifically, FIG. 1 is a transmission electron micrograph (TEM) of composite particles prepared from Ludox AS-40 silica and methacryloxypropyltrimethoxysilane (MPS), with a ration of monomer to silica ($M_{MPS}/M_{silica}$) of 2.2 and no pH adjustment. A TEM of composite particles using Ludox AS-40 silica, MPS, $M_{MPS}/M_{silica}$=5.0 and no pH adjustment, is presented in FIG. 2. FIG. 3 is a TEM of composite particles synthesized using MPS, ST-O40 silica, $M_{MPS}/M_{silica}$=2.2, pH 8.5. A TEM of composite particles prepared using MPS, ST-O40 silica, $M_{MPS}/M_{silica}$=5, pH 8.5 is shown in FIG. 4. FIG. 5 is a TEM of composite particles synthesized using sol gel silica, MPS and styrene as co-monomer. TEM images of the particles prepared using sol gel silica and titania with MPS are shown in FIG. 6. Composite particles using sol gel silica, MPS, and methyl methacrylate as co-monomer had the transmission electron micrographs shown in FIGS. 7 and 8. TEM micrographs of composite particles using sol gel silica, MPS, and hydroxypropyl methacrylate as co-monomer are presented in FIGS. 9 and 10 and TEM micrographs obtained for composite particles synthesized using sol gel silica, MPS, and trifluoroethyl methacrylate as co-monomer are shown in FIG. 11. Composite particles prepared using sol gel silica and MPS (MPS/silica=1.5) had the TEM and SEM micrographs shown in FIGS. 12A and 12B.

The metal oxide-polymer composite particles may have an average diameter (volume average) of about 20 nm to about 500 nm. Where the aspect ratio is not unity, the diameter refers to the largest diameter of the particle. For example, the volume average diameter of the metal oxide-polymer composite particles may be about 20 nm to about 50 nm, 50 nm to about 100 nm, about 100 nm to about 150 nm, about 150 nm to about 200 nm, about 200 nm to about 250 nm, about 250 nm to about 300 nm, about 300 nm to about 350 nm, about 350 nm to about 400 nm, about 400 nm to about 450 nm, or about 450 to about 500 nm.

The metal oxide-polymer composite particles preferably have a density less than the specific density of the metal oxide itself (e.g., silica has a specific density of 2.2 $g/cm^3$, titanium dioxide has a density of 3.6 $g/cm^3$). For example, the specific density of the composite particles may be from about 30% to about 35%, about 35% to about 40%, 40% to about 45%, about 45% to about 50%, about 50% to about 55%, about 55% to about 60%, about 60% to about 63%, from about 63% to about 67%, from about 67% to about 70%, from about 70% to about 73%, from about 73% to about 76%, from about 76% to about 79%, from about 79% to about 82%, from about 82% to about 85%, or from about 85% to about 90% of the specific density of the metal oxide contained therein. The density may be measured by helium pycnometry.

Composite particles that can be employed in some of the embodiments described herein and methods for preparing them are described in International Application Publication No. WO 2013/063291 A1, to D. Fomitchev et al., published on May 2, 2013, which is incorporated herein by reference in its entirety.

The core diameter, for example, can be within the range of from about 20 nm to about 500 nm, e.g., within the range of from about 20 to about 50 nm, from about 50 to about 100, from about 100 to about 150, from about 150 to about 200, from about 200 to about 250, from about 250 to about 300, from about 300 to about 350, from about 350 to about 400, from about 400 to about 450 or from about 450 to about 500 nm.

The diameter of the metal oxide particles can be within the range of from about 10 to about 200 nm, for example from 10 to about 25, from 25 to about 50, from 50 to about 75, from 75 to about 100, from about 100 to about 125, from about 125 to about 150, from about 150 to about 175, from about 175 to about 200 nm. The size of the metal oxide particles and the degree to which the particles protrude from the surface may play a role in how much of the metal oxide particle is available (exposed) for abrading during CMP processes. It is thought, for example, that removal rates might increase as the particle volume exposed increases. For example, about half of the metal oxide particle may be exposed. On the other hand, increasing the exposed volume beyond a given point may result in a particle that is not well anchored in the polymer matrix. During operation, such a weakly held particle can be prone to becoming dislodged and falling off, reducing the overall efficacy of the CMP process. Thus it may be desirable to establish a balance between increasing the exposed volume of the embedded particle while also preserving its retention in the polymer matrix.

A function of the mass fraction and the diameter of the metal oxide particles, the fractional surface coverage may play a role in overall net physical properties of the composite particles. These properties may potentially influence CMP abrasivity, removal rate, defectivity, uniformity, selectivity, and other CMP performance properties.

As already noted, the core can be entirely organic (polymer) or a hybrid of organic and inorganic materials. Tailoring the composition of the core may influence the mechanical properties (Young's modulus, elasticity, flexural toughness) of the core. Adjusting the mechanical properties, for instance in conjunction with CMP pad pressure, may contribute to striking a balance between defectivity (number of scratches per unit area) and material removal rates.

For instance, the polymer core can help "dampen" inhomogeneities in the pad pressure, pad surface, pad flatness, and so forth. The ability to control the mechanical properties of the core particle enables a dampening effect for the non uniformity in polishing pad surfaces, which non-uniformity normally causes defectivity in the wafer. The particles are effectively hard and soft at the same time. Multiple contact points also distribute load across the surface, reducing stress deformations and scratches in the wafer substrate surface.

The hardness of the metal oxide particles may be adjusted, for instance by selecting a certain composition of inorganic material (e.g., silica, alumina, ceria, zirconia, titania, metal oxide mixtures, borates, silicates, phosphates, titanates, carbides, carbonates, or other inorganic materials or mixtures of materials) having desired hardness characteristics), controlling the size of these particles (bigger sizes tending to be more abrasive) and/or type of a given inorganic material such fumed metal oxide particles versus colloidal or sol-gel materials. Particularly suited for CMP applications are metal oxides such as, for example, silica, alumina, zirconia, titania, ceria, or any combination thereof.

Other considerations, such as, for example, reactivity towards a specific substrate, whether the composite particles described herein are used in conjunction with other abrasive particles, and so forth may also play a role in selecting a particular metal oxide. Silica, for example, may be selected (at least in part) because of its reactive character toward certain workpiece materials, leading to the formation of a silicate surface, which can then become vulnerable to mechanical erosion/chemical attack, thus increasing material removal rates. In other cases, a metal oxide can be selected because it is redox active. Cerium oxide, for instance, can exist in $Ce^{4+}$ or $Ce^{3+}$ form and these can react with surface compounds at the point of contact with the workpiece.

Surfaces of the core particle and surfaces of the inorganic oxide particles are chemically distinct (different) and each may be independently treated (e.g., chemically) to give additional and potentially different functionality. The polymer core, for example, may have a coordinating functionality (e.g., amine or olefinic groups) that can coordinate with metal ions removed from the substrate surface.

The composite particles described herein can deliver the abrasion characteristics of the colloidal particles they contain, yet they can be packaged into a larger particle. This reduces the potential for contamination of the substrate surface with adventitious small particles that might otherwise get trapped in surface structures. Van der Waals forces dominate adhesion to surfaces at length scales less than 100 nm, and colloidal silica particles of that size or smaller can be difficult to clean off Use of composite particles which are larger than 100 nm in diameter ensures that the particles "behave" hydrodynamically and physically as larger particles that are easier to remove with flows of water and cleaning approaches, even where the composite particles contain inorganic particles less than 100 nm in size. In addition to the reduced contact points and larger size, the bulk density of the particles is reduced, facilitating their ability to be dislodged via convective fluid flows.

Figure 13:
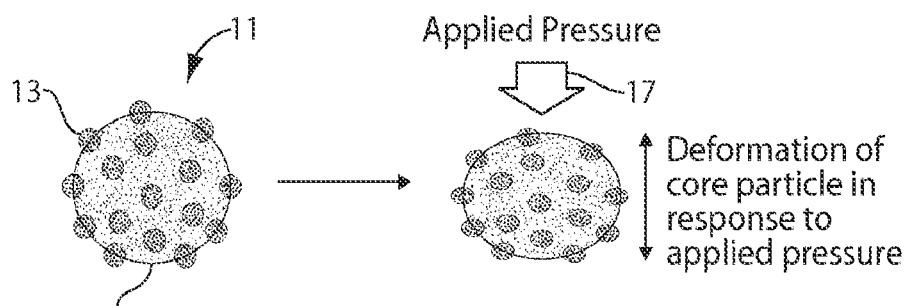
FIG. 13 is an illustration depicting the deformation of a polymer-metal oxide particle under applied pressure.

If considerably larger than the metal oxide particles (ratio of at least 2:1, e.g., within a range of from about 2:1 to about 20:1, for example, 5:1, 10:1 or 15:1) the core diameter can help define and control the pad/wafer interaction gap. This in turn can affect the removal rate along with the abrasivity of the inorganic components by ensuring they contact the wafer surface with much less down force than may be otherwise exerted by the pad. Since increased down force increases removal, defectivity, and nonuniformity, the reduction in down force can lead to less overall defectivity. Dampening of the down force applied by the polishing pad is illustrated in FIG. 13. As shown in this schematic diagram, metal oxide-polymer composite particle 11 includes metal oxide particles 13, embedded in polymeric core 15. The polymeric core is capable of deformation (see the somewhat flattened shape of composite particle 11) in response to an applied pressure (represented by arrow 17), thus dampening the down force being applied. Additionally, this size control may further aid the within wafer and within die uniformity over larger distances, especially as pad and wafer sizes increase to accommodate 300 mm and 400 mm wafer CMP technologies.

Figures 14A, 14B:
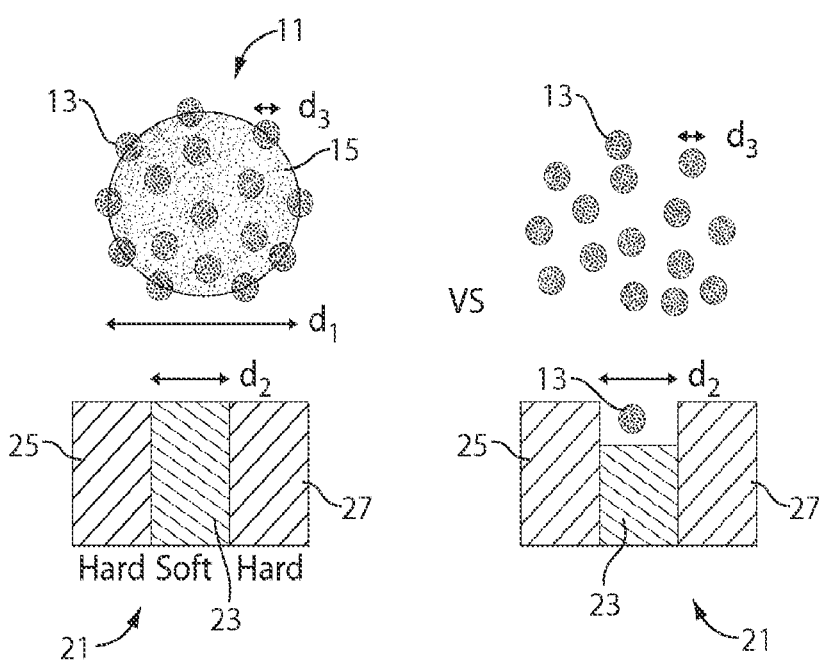
FIGS. 14A, 14B and 14C illustrate relative dimensions of particles and regions on an exemplary surface being processed.

Utilizing the polymer-metal oxide composite particles described herein can help control (reduce) over polishing of soft surfaces in the presence of hard surfaces especially when the feature sizes to be etched can be matched to the dimensions of the colloidal composite particles. FIGS. 14A and 14B illustrate the polishing of a substrate that includes multiple materials having different compositions including both hard (less easily abraded) and soft (more easily abraded) materials. Shown in FIG. 14A is workpiece 21, including softer material 23, having diameter d2 and disposed between harder materials 25 and 27. In such a case, the diameter (d3) of the metal oxide particles 13 and the diameter (d1) of core particles 15 can be tailored relative to the dimensions (d2) of the softer material 23 sandwiched between harder materials 25 and 27 in a manner that reduces or minimizes over abrasion of the softer material. Thus the core particle structure effectively acts as an etch-stop because d1>d2. This is in contrast to the situation illustrated in FIG. 14B, where the same metal oxide particles 13 are used in loose form (without the core) and thus can etch the softer surface more extensively because the d3-sized metal oxide particles are small enough to penetrate the d2-sized features of softer material 23.

Figure 14C:
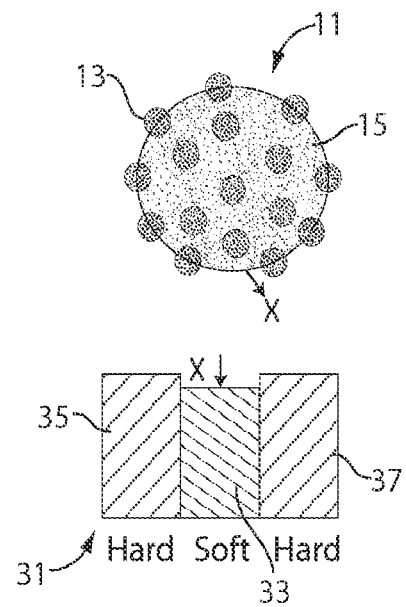

In yet another embodiment, this effect can be used to selectively etch a target having a more easily-etched-surface in the presence of a less easily-etched-surface. Shown in FIG. 14C is workpiece 31 including soft material 33 positioned between harder materials 35 and 37. The soft material can be etched to a prescribed thickness (depth x in FIG. 14C) by using the ratios of d1, d2 and d3 described above and a metal oxide-polymer composite particle where the embedded metal oxide particle 13 protrudes from the surface of core 15 by a distance x. This approach provides a method to make surface features (trenches) with length scales at a fraction of the smallest particle diameter (e.g. 50%) without the need to use highly dispersed fine particles which can aggregate, cause scratches or otherwise contaminate the surface due to the high surface energy associated with their small size.

Figure 15:
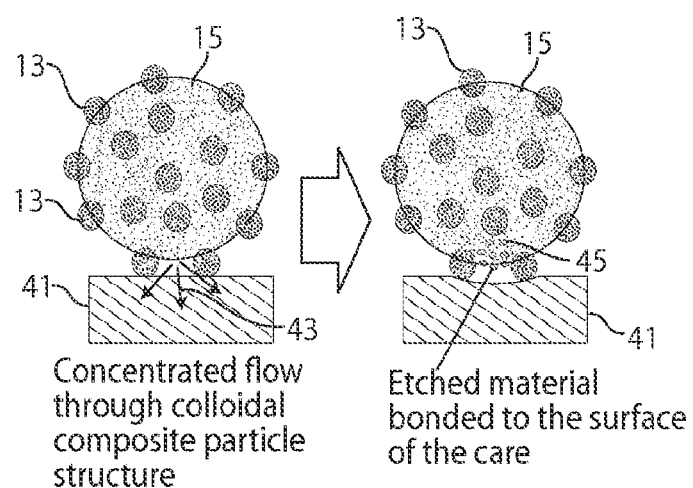
FIG. 15 illustrates effects of an etching ingredient incorporated in a metal oxide-polymer composite particle.

An important parameter in CMP operations is the fluid flow of and mechanism of etched material removal. The surface chemistry and structure of the composite particles can be tailored to enhance the removal of the etched material away from the substrate surface and could also be trapped on the core particle surface when the surface chemistry of the core particles is tailored to attract the debris or chemicals evolved from the abraded surface. Surface modification materials that could be utilized include compounds that have redox properties (such as, for instance, cerium-containing compounds) or acidic or basic surface groups. Shown in FIG. 15 is metal oxide-polymer composite particle 11, including metal oxide particles 13, embedded in polymeric core 15. In the normal course of CMP processing of workpiece 41, the concentrated flow of etched material is illustrated by arrows 43. With a surface modification such as described above, however, etched material 45 can be trapped to the surface of or become embedded into core 15 of the metal-polymer composite particle. Designing composite particles that can retain at least some abraded material would reduce the amount of debris present at the pad-wafer interface. Residual particles or debris left on wafer (not removed during post CMP cleaning) are a source of defectivity. Additionally, removed material debris can get caught in the pad, altering the pad properties, or potentially damaging the wafer during the continuing CMP process. Collecting and lowering the free abraded material stuck on wafer or pad surfaces may decrease scratching and polishing pad clogging and reduce the need for pad conditioning or dressing. This may be achieved via the deposition of specific regions on the composite particles which have surface chelating groups, opposite charge to the substrate surface materials at a given pH, or some other intrinsic chemical or physical attraction to the surface materials. Due to the presence of the protruding abrasive species on the composite particles, the only way for these patches of strong surface material attraction to function is remove debris once it is freed from the substrate by the action of CMP.

In some embodiments the metal oxide-polymer composite particles include "additional" materials (other than the polymer and inorganic particles) that may contribute to improving the CMP process. In specific examples, the additional ingredient is one that may be used in a CMP slurry (further discussed below). This approach can serve to partially or entirely replace use of the ingredient in the slurry, potentially simplifying slurry composition and/or reducing the amounts of the ingredient otherwise required. The approach can also provide additional amounts of an ingredient or a different ingredient to the CMP operation. Furthermore, the presence of the ingredient can be localized to a well defined region, in particular the work region where the metal oxide-polymer composite particles come in contact with the surface of the workpiece.

In one example, the metal oxide-polymer composite particles provide chemical etchants, e.g., metal oxidizers, such as hydrogen peroxide, metal binding, complexing, or chelating groups, such as, for example, quinolinic acid. Chemical etchants can be present in the composite particles in an amount within the range of from about 0.1 wt % to about 10 wt %, e.g., from about 0.5 wt % to about 5 wt % based on total mass of the composite particles.

Chemical removal accelerators can be added to enhance the chemical aspects of polishing to achieve higher rates or greater selectivity. Suitable examples include: phosphate compounds (e.g., ammonium hydrogen phosphate, ammonium dihydrogen phosphate, potassium dihydrogen phosphate, bis(2-ethylhexyl)phosphate, 2-aminoethyl dihydrogen phosphate, 4-chlorobenzene diazonium hexafluorophosphate, nitrobenzene diazonium hexafluorophosphate, ammonium hexafluorophosphate, bis(2,4dichlorophenyl)chlorophosphate, bis(2-ethylhexyl)hydrogenphosphate, calcium fluorophosphates, diethyl chlorophosphate, diethyl chlorothiophosphate, potassium hexafluorophosphate, pyrophosphate, tetrabutylammonium hexafluorophosphate tetraethylammonium hexafluorophosphate, and any combination thereof), phosphite compounds (e.g., bis (2-ethylhexyl)phosphate,) or other suitable materials. These and/or other rate accelerators can be present in the particles in an amount within the range of from about 0.1 wt % to about 10 wt %, e.g., from about 0.5 wt % to about 5 wt % based on total mass of the composite particle.

Selectivity can be increased by passivating agents that can be incorporated in the metal oxide-polymer composite particles. The role of these agents is that of protecting one surface over another, e.g., exhibiting markedly lower nitride CMP removal rate versus oxide removal rate. Some non-limiting examples of passivating agents that can be incorporated in the polymer-metal oxide composite particles are: various anionic, nonionic, and cationic surfactants and polymers. Suitable anionic polymeric passivation agent include one or more of poly(acrylic acid), poly(methacrylic acid), poly(acrylic acid-maleic acid), poly(methacrylic acid-maleic acid), poly(acrylic acid-acrylamide), poly(acrylonitrile-butadien-acrylic acid), poly(acrylonitrile-butadien-methacrylic acid), a derivative or salt of any of the foregoing, and any combination thereof. Passivating agents can be present in the particles in an amount within the range of from about 0.1 wt % to about 10 wt %, e.g., from about 0.5 wt % to about 5 wt % based on total mass of the composite particle. Polymers like those described above could be present during the initial synthesis of the composite particles, or they could be added to the composite particle post synthesis by physical or chemical adsorption to the surface of the inorganic or polymer phase of the composite particles. Derivative chemistries such as alkoxysilane functionalization or other chemistry could enable direct covalent coupling to the surface silanols as another alternative of attaching passivating agents to the composite particle surface.

Additional materials such as those described herein can be incorporated into the metal oxide-polymer composite particles at any suitable point during the preparation of the particles. For instance, a chemical etchant, an accelerator or a passivating agent can be added during or after the formation of the composite particles.

As discussed above, the inorganic particulates in the composite particles may be treated before, during or after the preparation of the metal oxide-polymer composite particles described herein. Organic modifiers, inorganic modifiers, or both can be used to alter the chemistry and/or functionality of the metal oxide particles (or other inorganic particulates) employed in the composite. For example, the metal oxide particles can be treated to enhance CMP material removal properties, to change the reactivity of the metal oxide particles towards specific species in the workpiece, to shift the hydrophilic/hydrophobic character of the surface, or for other reasons.

Adjustments also can be made with respect to the core. For example, the surface or bulk chemistry of the core can be designed to provide properties that might prevent or minimize re-deposition of abraded materials, debris, undesired byproducts and so forth back onto the surface being planarized. Examples of additional materials that can be used include metal chelating agents (for planarizing metal surfaces), materials that could bind to the surface of the removed or abraded substrate oxide bits, e.g. alkoxy silane materials, phosphates, and so forth, (in the case of CMP of metal oxide surfaces). These additional materials can be present at the core surface and/or throughout the core. The selection of these moieties can be tailored to be most active at working temperatures, which are often hotter than room temperature (e.g. 25° C.) and can be as high or higher than 60° C. from the friction resulting from the CMP action. The actual temperatures depend on the substrate surface (metal or oxide for example), the CMP polishing duration, down force and other process variables.

Additional materials can be added during or after the formation of the metal oxide-polymer composite particles.

The metal oxide-polymer composite particles disclosed herein can be used in alternate CMP processes. For example, they can be incorporated in CMP slurries, CMP polishing pads or in other CMP-related compositions or tools. These composite particles also are suitable for the chemical mechanical polishing (also abbreviated as CMP) of optical components, dental materials, glass, semiconductors, ceramic surfaces (including but not limited to light emitting diodes, photovoltaics, semiconductors, and optical fibers) as well as stock silicon wafers, ceramic and refractory materials, and others. In these alternate CMP processes, these slurries are implemented in similar fashion such that the abrasive components of the composite particles are brought into abrasive contact with the desired substrate to polish or remove substrate material.

A specific aspect of the disclosure relates to CMP slurries that include metal oxide-polymer composite particles such as those described above. As used herein, the term "slurry" refers to a dispersion of solid particles in a liquid medium. For most, if not all CMP applications, the slurry is aqueous. If desired, non-aqueous slurries, or aqueous/solvent combinations can be formulated following known general principles and the teachings provided here. In specific implementations, an exemplary aqueous dispersion for CMP of a metal film includes metal oxide-polymer composite particles in an amount of 1-10% wt, 5-15%, 10-20% wt, or 15-30% wt based on the total weight of the slurry.

Typically, the metal oxide-polymer composite particles are "dispersed" in the slurry, meaning that these particles are distributed throughout the liquid (e.g., aqueous) medium. Preferably they are evenly distributed. As used herein, the term "colloidally stable" describes a dispersion of particulate material (e.g., the metal oxide-polymer composite particles described above) in a liquid medium and which remains dispersed by Brownian Motion absent interaction with other particulate species. That is, as a standalone ingredient for integration into a slurry with other particulate species, a colloidally stable dispersion is generally substantially free of agglomeration and the particulates may be substantially monodispersed, and stable with minimal variation at ambient conditions for a suitable time, e.g. many months, without disturbance. In some embodiments the state of dispersion of the particulate materials employed in the slurry may be altered.

Shelf life can be an important consideration for ready-made slurries and many dispersions described herein can remain stable (without phase separation, aggregation, or settling) for days, weeks, months, years or indefinitely. Shelf life requirements can be relaxed for slurries that are prepared at the time and point of use. In such cases, the dispersion only needs to be stable for minutes or hours. Generally, stable slurries are advantageous in terms of process repeatability, process stability, lower surface defectivity, better performance consistency and other considerations important in CMP.

In some cases preparing a stable CMP dispersion is not straightforward and difficulties may be encountered, for example, when attempting to form a stable aqueous dispersion of metal oxide-polymer composite particles.

Several approaches can be employed to address this problem. In some implementations, dispersion stabilization is obtained through mechanical approaches, e.g., by using, for instance, a high energy mechanical dispersion machine such as described in U.S. Pat. No. 8,062,547, issued to Paik et al. on Nov. 22, 2011.

In other implementations, the composite particles are treated with a hydrophilic additive such as, for example, alkyl ethoxylate, linear alkylbenzene sulfonate (LAS), alkyldimethyl amine oxide, and alkyl carboxy betaine. The hydrophilic additive may be added in an amount of 0.0001-10 wt %, and comprises, in many cases, a polymer having a molecular weight of 2,000-50,000 g/mol.

In further implementations, dispersion stabilization of an aqueous CMP slurry containing metal oxide-polymer composite particles is enhanced by including a dispersing agent, such as, for instance, a polymeric dispersing agent, e.g., polyethylene glycol, polyampholyte, potassium nonanoic acid and the like. The dispersing agent can be added in an amount of 0.0001-10 wt % and can comprise a polymer having a molecular weight of 2,000-50,000 g/mol. As discussed in U.S. Pat. No. 8,062,547, issued to Paik et al. on Nov. 22, 2011, dispersing agents with molecular weights that are more than 50,000 g/mol can cause re-agglomeration between particles due to a phenomenon such as bridging, thus promoting the formation of large particles. Alternatively, steric stabilization can be imparted by other nonionic surfactants such as the sorbitol series known as Tween® 20, 40, 60, 80 and etc. or polyethylene oxide (PEO)/polypropylene oxide (PPO) copolymers of varying block length could be considered. The number in the Tween series or the PEO-PPO copolymer block length refers to the hydrophilic/lypophilic balance in properties presented by the chemical structure, which can have a strong influence on particle stability, by a similar means as that described.

In a further example, the slurry may include a weak acid, organic acid, or weak base for pH adjustment and slurry stabilization. In this case, slurry stabilization by pH manipulation refers to attaining the pH at which the particles gain sufficient surface charge (as measured by zeta potential) to become electrostatically stable. For example, a typical composite particle of MPS formed polymer and 20-50 nm silica particles, of average composite particle diameter 300 nm, with approximately 40-50% of the silica particle surface exposed to the aqueous dispersion liquid (the remainder being embedded in the hydrophobic polymer core) and nothing else in the dispersion can be well stabilized by the addition of ammonia or potassium hydroxide at pH 10. Such a simple dispersion or slurry can be easily used for oxide ILD type CMP applications. Note that for more complex formulations of slurry, this acid or base must also achieve stabilization of various other slurry components.

Typically, when immersed in a solution, colloidal particles such as the metal oxide-polymer composite particles described herein will have a surface charge caused by adsorption/desorption effects. The surface charge can be modified through pH adjustments (silica, for example, has an isoelectric point (IEP) at a pH of about 2 to 3), use of charged additives (e.g., salts), use of surfactants, and through other techniques known in the art.

There are no particular constraints with respect to the pH of slurries described herein. Slurry pH can be adjusted according to the requirements of a particular application. In one example, a pH adjustor such as potassium hydroxide or ammonia is incorporated in the dispersion to adjust its alkalinity. Typically, in interlayer dielectric oxide polishing processes, the pH is about 11 in order to maximize the solubility of the substrate and facilitate removal rates without dissolving the abrasive silica particles in the slurry.

The CMP slurry described herein, containing metal oxide-polymer composite particles in a liquid medium, can include additional components or ingredients, Example include but are not limited to rheology agents, oxidizing agents, chelating agents, complexing agents, corrosion inhibitors, surfactants, particulate materials other than the polymer-metal oxide particles described herein, combinations thereof and/or other components. In turn, any of these ingredients, as well as the metal oxide-polymer composite particles described herein can be provided in a liquid vehicle, such as, for instance, water; alcohols, such as isopropyl alcohol, methanol, ethanol, propanol, butanol; ethylene glycol; propylene glycol; glycerin; ketones, such as acetone; ethers, such as diethylether, tetrahydrofuran (THF); water-alcohol solutions; other solvents; or combinations of solvents.

Rheology agents can be included in the CMP slurry to control its viscosity and to structure the laminar flow of the slurry, for instance to reduce vertical fluid motion. Any conventional rheology agents can be used in the present slurry compositions, including, but not limited to, cross-linked acrylic polymers and water soluble polymers (WSPs). Some examples include modified cellulose derivatives, cellulose ethers, starch derivatives, pectin derivatives, polyacrylamides, hydroxypropylcellulose, hydroxyethylcellulose, and carboxymethylcellulose. Mixtures of two or more rheology agents also can be utilized.

Chelating agents can further be included in the slurry composition. Such agents can be used, for example, in abrasive slurries wherein they chemically react with metal ions removed from the polished/planarized surface to form a soluble metal complex to minimize re-deposition of metal ions on the surface of the substrate. Any conventional chelating agents can be used and include, for example, one or more amine or amide groups (e.g. ethylenediaminetetraacetic acid, ethylenediamine, and methylformamide) and organic acids (e.g. iminodiacetic acid and oxalic acid).

The slurry can also include one or more corrosion inhibitors. When provided in a CMP slurry these compounds can react with the fresh polished/planarized surface and/or oxidized surface to passivate the surface and prevent excessive etching of the surface during CMP operations. Illustrative examples of corrosion inhibitors that can be used, include, but not limited to, alkyl amines, imidazole, aminotetrazole, benzotriazole, mercaptobenzothiazole, 5-methyl-1-benzotriazole, benzimidazole, amino, imino, carboxy, mercapto, nitro, alkyl, urea and thiourea compounds and derivatives, etc., dicarboxylic acids such as oxalic acid, malonic acid, succinic acid, nitrilotriacetic acid, iminodiacetic acid, and combinations thereof.

In many cases, the slurry includes one or more surface active agents (surfactants). Suitable surfactants include nonionic, anionic, cationic, nonionic, zwitterionic, amphoteric, and polyelectrolyte compounds. Surfactants that can be utilized are disclosed in, for example, Kirk-Othmer, Encyclopedia of Chemical Terminology, 3rd Edition, Vol. 22 (John Wiley & Sons, 1983), Sislet & Wood, Encyclopedia of Surface Active Agents (Chemical Publishing Co., Inc. 1964), Ash, The Condensed Encyclopedia of Surfactants (Chemical Publishing Co., Inc., 1989), Tadros, Surfactants (Academic Press, 1984), all of which are incorporated herein by reference. Specific examples include salts of organic acids, alkane sulfates, alkane sulfonates, hydroxides, substituted amine salts, betaines, polyethylene oxide, polyvinyl alcohol, polyvinyl acetate, polyacrylic acid, polyvinyl pyrrolidone, polyethyleneimine, esters of anhydrosorbitols, quaternary such as tetramethyl ammonium halides, cetyl trimethyl ammonium halides, nonyl ethers and combinations thereof. An aqueous dispersion for CMP of a metal film may include a surfactant such as anionic surfactant, cationic surfactant and/or nonionic surfactant. As the anionic surfactant, it is possible to employ aliphatic soap, sulfate ester, and phosphate ester, etc. As the cationic surfactant, it is possible to employ aliphatic amine salt, aliphatic ammonium salt, etc. Further, as the nonionic surfactant, it is possible to employ acetylene glycol, ethylene oxide adduct thereof, and acetylene alcohol, etc. Furthermore, it is also possible to employ silicone-based surfactants, polyvinyl alcohol, cyclodextrin, polyvinyl methylether, hydroxyethyl cellulose, etc. These surfactants may be employed singly or as a mixture comprising two or more kinds.

The slurry may contain particles other than the polymer-metal oxide particles described herein. In many examples, these "additional" particles also are dispersed in the liquid medium. Examples include other types of particles suitable in conducting CMP operations, such as, for example, silica, alumina, silicon carbide, and so forth.

The slurry can also include one or more oxidizing agents. These agents generally include any substance which removes metal electrons and raise the atomic valence. Oxidizing agents include, but are not limited to, hydrogen peroxide, urea hydrogen peroxide, monopersulfates, dipersulfates, peracetic acid, percarbonates, organic peroxides such as benzoyl peroxide, di-t-butyl peroxide, periodic acid, periodiate salts, perbromic acid, perbromate salts, perchloric acid, perchloric salts, perboric acid, perborate salts, permanganates, permanganate salts, hydroxylamine, ferric nitrate, and nitric acid. For instance, the oxidizing agent can be ammonium persulfate, potassium persulfate, ferric nitrate, diammonium cerium nitrate, iron sulfate, ozone and potassium periodate. The content of the oxidizing agent may be from 0.05 to 5 wt % based on the aqueous dispersion, for example, from 0.08 to 3 wt % based on the aqueous dispersion.

In some implementations, the CMP slurry includes an oxidizing agent for metal and/or a metal complexing agent for forming an organometal complex. In specific implementations, the content of the complexing component is from 0.001 to 3.0 wt % based on the aqueous dispersion, for example, from 0.05 to 2.0 wt % based on the aqueous dispersion.

Combinations of oxidizing agents and/or complexing agents also can be employed. For instance, the complexing agent may combine a first complexing agent for forming a water-insoluble complex and a second complexing agent for forming a water-soluble complex. In the present context, the terms "water-insoluble" is intended to mean that the complex cannot be substantially dissolved in water, so that as long as the wet etching rate is less than 3 nm/min in the presence of an oxidizing agent, such a hardly soluble complex will be included in this definition. On the other hand, the terms "water-soluble" is intended to mean that the wet etching rate is 3 nm/min or more.

As the first complexing agent which forms, together with a metal, a complex which is insoluble or hardly soluble in water, it is possible to employ, for example, heterocyclic compounds such as 6-membered heterocyclic compound containing at least one N atom and 5-membered heterocyclic compound containing at least one N atom. More specifically, it is possible to employ quinaldinic acid, quinolinic acid, benzotriazole, benzoimidazole, 7-hydroxy-5-methyl-1,3,4-triazaindolidine, nicotinic acid, picolinic acid, etc. In some implementations, the first complexing agent is an anionic surfactant used to form a water-insoluble complex. Examples include but are not limited to alkylbenzene sulfonate, examples of which include, for example, potassium dodecylbenzene sulfonate, ammonium dodecylbenzene sulfonate, etc. If employed, the content of the first complexing agent may be from 0.0005 to 2.0 wt % based on a total weight of the aqueous dispersion for CMP, for example, from 0.0075 to 1.5 wt %, e.g., 0.0075 to 0.01, 0.01 to 0.05, 0.05 to 0.1, from 0.1 to 0.5%, from 0.5 to 1.0, from 1.0 to 1.5% based on a total weight of the aqueous dispersion for CMP.

The second complexing agent forms a water-soluble complex and can serve as a polish-accelerating agent. Examples of the second complexing agent include but are not limited to amino acids such as glycine, alanine, tryptophan, etc. Organic acids exhibiting almost the same effects as those of the above-mentioned materials can be effectively employed. Examples of such organic acids include, for example, formic acid, lactic acid, acetic acid, tartaric acid, fumaric acid, glycolic acid, phthalic acid, maleic acid, oxalic acid, citric acid, malic acid, malonic acid, glutamic acid, etc. Furthermore, it is also possible to employ ammonia, ethylene diamine, and basic salts such as tetramethyl ammonium hydroxide (TMAH). The second complexing agent may be provided in an amount of from 0.0005 to 2.0 wt %, for example, from 0.0075 to 1.5 wt %, e.g., 0.0075 to 0.01, from 0.01 to 0.05, from 0.05 to 0.1, from 0.1 to 0.5, from 0.5 to 1.0, from 1.0 to 1.5% based on a total weight of the aqueous dispersion for CMP. The amount used may depend, at least in part on the composition of the metal.

Each of these first and second complexing agents may be employed singly or in a combination of two or more kinds.

Figure 16:
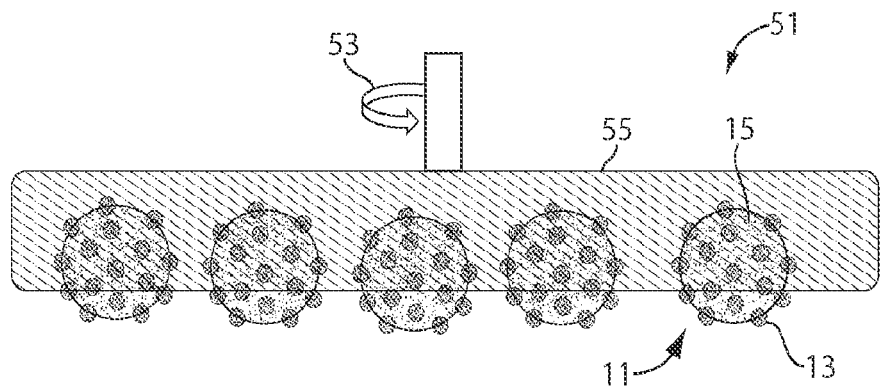
FIG. 16 is a schematic diagram of a CMP polishing pad according to embodiments of the invention.

Another aspect of the disclosure relates to a tool, and in particular a polishing pad, used in CMP or other polishing processes, that includes the metal oxide-polymer composite particles described herein. Incorporating the composite particles in the CMP polishing pad can reduce the mass of free particles in the liquid slurry and therefore reduce the potential for contamination of the substrate surface. Furthermore, the "hard-soft" nature of these particles can help reduce scratch defects. For illustrative purposes, shown in the schematic diagram of FIG. 16 is CMP polishing pad 51 that can rotate in the direction of arrow 53. The pad includes a plurality (two or more) of metal oxide-polymer composite particles 11 at working surface 55 of the polishing pad.

The CMP pad can be made of a polymeric material. In specific examples, the pad is fabricated from a microcellular polyurethane or another suitable material. The CMP pad can be porous or non-porous.

In general, a porous polishing pad tends to provide improved slurry transport and localized slurry contact. Techniques for introducing porosity into pad materials include incorporating beads or hollow polymeric microspheres into the material. Microspheres-filled pads often have pore sizes greater than 20-30 microns, depending on the size of the microspheres. In some instances, a polymeric matrix used to manufacture the pad has been combined with polymeric microelements that soften or dissolve upon contact with a polishing slurry.

In other approaches, porosity is introduced through frothing techniques, such as for example, inert gas frothing. Gas frothing can produce wider pore size distributions, e.g., larger than 30 microns. In one example (see, e.g., U.S. Pat. No. 8,052,507, issued to Huang, et al. on Nov. 8, 2011) the froth incorporates a filler that, during operation of the pad, dissolves in the CMP slurry and imparts added porosity at the working surface of the pad.

In some embodiments, the metal oxide-polymer composite particles are distributed throughout the body of the CMP polishing pad. To prepare such polishing pads, metal oxide-polymer composite particles such as those described herein can be added at any suitable point during the fabrication of the pad. For example, the composite particles can be added to a liquid phase precursor, solvent, a froth, a frothing medium, and so forth. In certain cases metal oxide-polymer composite particles are added in a manner similar to that of incorporating conventional fillers (e.g., porosity inducing microspheres) and/or abrasive particles in CMP polishing pads.

In other embodiments, the composite particles are embedded at the working surface of the pad. For instance, metal oxide-polymer composite particles can be present in a coating (e.g., film or layer) at the working surface of the pad. Thus in some implementations, a conventional polishing pad or a polishing pad support is provided with a coating that consists of, consists essentially of or comprises metal oxide-polymer composite particles such as those described herein.

In specific examples, the pad has a coating that includes, in addition to composite particles, one or more materials such as, for example, a binder, additives, fillers, other abrasive particles and so forth. If a binder is used, the metal oxide-polymer composite particles can be homogeneously or inhomogeneously dispersed in the binder. The coating may further include a backing, friction layers, and/or other elements, as known in the art. In some cases, no backing is utilized. Conventional CMP tools that contain abrasive coatings are described, for instance, in U.S. Pat. No. 5,958,794, issued to Bruxvoort et al, on Sep. 28, 1999, which is incorporated herein by reference in its entirety.

The pad can be designed to provide desired properties such as rebound (a low rebound tending to absorb relatively high amounts of energy during cyclic deformation, causing less dishing during polishing and yielding better WID uniformity) and stiffness (an important consideration for WID uniformity and prolonged pad life). Additionally, the pad can be designed to offer a decreased tendency to glaze during polishing (reducing or minimizing the need for pad conditioning) and/or other characteristics.

The CMP polishing pad can be designed to have desired "damping" properties. Generally, damping refers to the ability of a material to absorb mechanical energy and can be measured by the Bashore rebound method, a simple technique for testing the rebound of a material. The Bashore rebound test is known in the art and is described, for instance, in the American Society for Testing and Materials (ASTM) Standard D-2632. In illustrative examples, the pad described herein has a Bashore rebound within the range of from about 25% to about 50%. Pads with other Bashore rebound values can be prepared. Use of pads modified with bound composite particles at their surfaces can leverage the composite particle properties to offset pad limitations and dissipate excessive stress or rebound without needing to design in that response to the foam pad.

Damping effects also can be described in terms of Energy Loss Factor (KEL), a parameter defined as the energy per unit volume lost in each deformation cycle. Generally, the higher the value of KEL for a pad, the lower the elastic rebound and the lower the observed dishing. To increase the KEL value, the pad can be made softer. However, this approach tends to also reduce the stiffness of the pad. The reduced stiffness results in decreased planarization efficiency and increases dishing or edge fastness (e.g. excessive edge material removal) due to conformation of the pad about the device corner as it passes under the edge of the device and then rebounds to contact the wafer.

Another approach for increasing the KEL value of the pad is to alter its physical composition in such a way that KEL is increased without reducing stiffness. This can be achieved by altering the composition of the hard segments (or phases) and the soft segments (or phases) in the pad and/or the ratio of the hard to soft segments (or phases) in the pad.

The slurry and/or tool described above can be used in processes for removing material from a substrate, typically through chemical and abrasive actions, to produce a processed surface. The process can further include operations designed to ready a substrate for processing and/or post processing steps. Examples include but are not limited to rough polishing, cleaning operations (e.g., post CMP cleaning), etching, metrology testing, pattern depositions and others.

In specific implementations, the process is characterized by increased removal rates, reduced defectivity count and/or increased cleanability with respect to a "comparative" process. As used herein, the term "comparative" process refers to a process that is the same as the process of the invention (also referred to herein as the experimental process) except with respect to the type of abrasive particles utilized. Whereas the experimental process is conducted with a slurry and/or tool that includes metal oxide-polymer composite particles such as described herein, no such particles are present in the slurry or tool employed in the comparative process. Instead, the slurry and/or tool in the comparative process can include fumed silica, sol gel silica, or other conventional abrasive particles suitable for a given application. Except for the particles utilized, the experimental slurry or tool will typically contain the same or substantially the same components, in the same or substantially the same amounts, as the comparative slurry or tool. Both the comparative process and the process of the invention are carried out on the same type of substrate.

Aspects of the invention are further clarified by the following examples which are intended to be only illustrative in nature.

EXEMPLIFICATION

Experiments were undertaken to prepare four samples of metal oxide-polymer composite particles. The metal oxide (MO) was fumed silica or a mixture of fumed and colloidal (sol gel) silicas. Specifically, the metal oxide contained a stable dispersion of L-90 fumed silica (tradename of Cab-O-Sperse 1015A) and, optionally, 25 nm sol gel silica (tradename ST-O40), both available from Cabot Corporation. The polymer used was poly-methacryloxypropyltrimethoxysilane (pMPS) and the radical initiator was azo-bisisobutyronitrile (AIBN).

Figure 17:
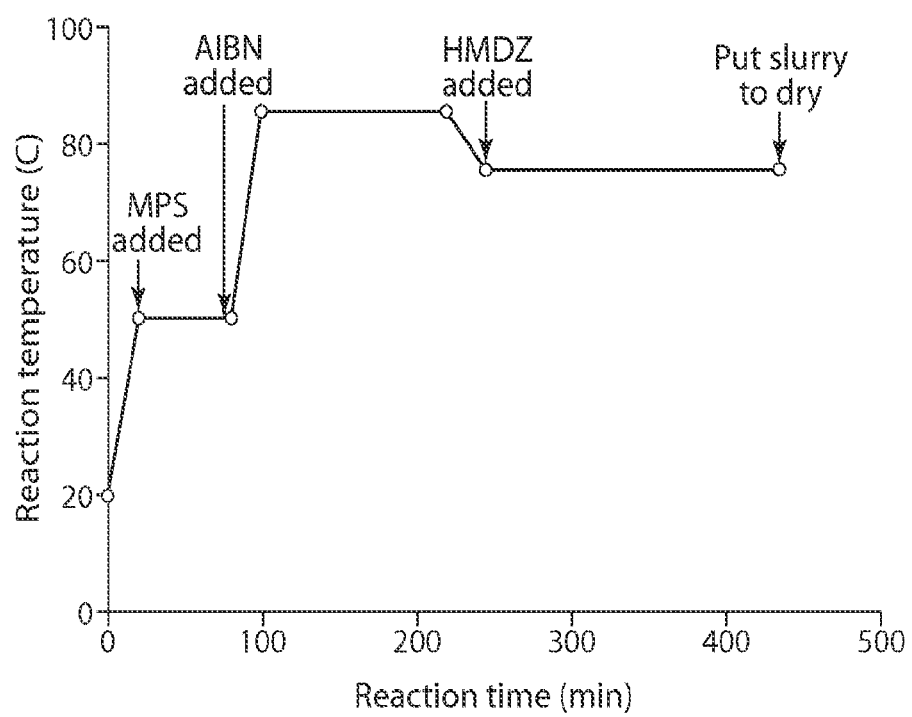
FIG. 17. is a diagram of a time-temperature profile for an exemplary method of making polymer-metal oxide particles.

Specifically, a 250 mL round bottom flask equipped with an overhead stirring motor, condenser, and thermocouple was charged with Cab-O-Sperse 1015A and Snowtex-O40 dispersions and DI water (see Table 1 for details). The pH of the dispersions was adjusted to 10-10.5 by adding few drops of solution of concentrated ammonium hydroxide in water. The temperature was increased to 50 C and methacryloxypropyltrimethoxysilane was added (further abbreviated as MPS, CAS#2530-85-0, Mw=248.3) in the amounts shown in Table 1. The mixture was stirred at the rate of ~150 rpm. After ~2 h at 50 C, 0.25 g of 2,2'-azobisisobutyronitrile (AIBN, CAS#78-67-1, Mw=164.2) radical initiator suspended in 10 mL of ethanol was added and the temperature increased to 85° C. Radical polymerization was allowed to proceed for 2 h and 30 min and then the temperature was reduced to 75 C as shown in FIG. 17 and 2 g of HMDZ was added to the mixture. The reaction with HMDZ continued for ~4 h after which the reaction slurry was strained through 0.5 mm sieve, transferred into a Pyrex tray, and set to dry overnight at 120 C. A white powdery solid was collected the next day and milled using an IKA M20 Universal mill.

The ratios of sol gel silica to fumed silica (w/w/ on a dry silica basis), the mass ratios $M_{MPS}/M_{silica}$ and other synthesis details such as the emulsion time (minutes) are presented in Table 1 below.

TABLE 1

|  | Exp. 1 | Exp. 2 | Exp. 3 | Exp. 4 |
| --- | --- | --- | --- | --- |
| Cab-O-Sperse 1015A slurry | 14.7 g | 2.0 g | 10.9 g | 3.0 g |
| ST-O40 colloidal silica dispersion | 5.4 g | 5.5 g | 0.0 g | 1.1 g |
| DI water | 126 g | 130 g | 123 g | 131 g |
| MPS | 13 g | 16.3 g | 16.3 g | 17.2 g |

Particle size distributions and surface area measurement for the composite particles of Samples 1-4 are shown in Table 2.

TABLE 2

| Sample ID | d10 (nm) | d50 (nm) | d90 (nm) | BET SA (m$^2$/g) |
| --- | --- | --- | --- | --- |
| 1 | 132 | 210 | 403 | 20.1 |
| 2 | 206 | 261 | 343 | 19.5 |
| 3 | 356 | 450 | 559 | 11.9 |
| 4 | 248 | 315 | 446 | 16.1 |

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for removing material from a substrate through chemical and abrasive actions, the process comprising:
   removing material from a substrate with a polishing pad or slurry composition, wherein the polishing pad, or the slurry composition, or both include metal oxide-polymer composite particles that comprise a plurality of metal oxide particles and a polymer core, to produce a processed surface, wherein:
   the metal oxide particles are modified with a bifunctional modifying agent via which the metal oxide particles are covalently attached to the polymer in the polymer core, and
   at least a portion of the metal oxide particles are partially embedded within the polymer core and project out from the polymer core.

2. The process of claim 1, further comprising cleaning the processed surface.

3. The process of claim 1, wherein the polymer core includes a polymer that is the same or different from the modifying agent.

4. The process of claim 1, wherein a portion of the metal oxide particles are fully embedded within the polymer core.

5. The process of claim 1, wherein the metal oxide-polymer composite particles further include one or more ingredients selected from the group consisting of a CMP chemical etchant, a CMP processing accelerator, and a CMP passivating agent.

6. The process of claim 1, wherein the CMP slurry composition further comprises a surfactant, a rheological agent, a corrosion inhibitor, an oxidizing agent, a chelating agent, a complexing agent, particles other than the metal oxide-polymer composite particles, or any combination thereof.

7. A CMP slurry composition comprising metal oxide-polymer composite particles dispersed in an aqueous media, the metal oxide-polymer composite particles including a plurality of metal oxide particles and a polymer core, wherein:
   the metal oxide particles are modified with a bifunctional modifying agent via which the metal oxide particles are covalently attached to the polymer in the polymer core, and
   at least a portion of the metal oxide particles are partially embedded within the polymer core and project out from the polymer core.

8. The CMP slurry composition of claim 7, wherein the polymer core comprises a polymer or copolymer of the modifying agent.

9. The CMP slurry composition of claim 7, wherein the metal oxide-polymer composite particles are treated with at least one additional modifying agent.

10. The CMP slurry composition of claim 7, wherein the metal oxide-polymer particles have a volume average diameter within the range of from about 20 nm to about 500 nm.

11. The CMP slurry composition of claim 7, wherein the polymer core comprises polymers of styrene, unsubstituted or substituted acrylates or methacrylates, olefins, vinyl esters, and acrylonitrile and copolymers and mixtures of the above.

12. The CMP slurry composition of claim 7, wherein the metal oxide particles comprise precipitated, pyrogenic, or sol gel metal oxide particles, or mixtures of two or more of these.

13. The CMP slurry composition of claim 7, wherein the metal oxide particles are selected from the group consisting of silica, alumina, ceria, titania, zirconia, zinc oxide, an iron oxide, niobium oxide, vanadium oxide, tungsten oxide, tin oxide, barium oxide, strontium oxide, calcium oxide, magnesium oxide, a phosphorus oxide, mixtures and mixed oxides of any two or more of these.

14. The CMP slurry composition of claim 7, wherein the metal oxide includes fumed silica.

15. The CMP slurry composition of claim 7, wherein the metal oxide-polymer composite particles further comprise one or more ingredients selected from the group consisting of a CMP chemical etchant, a CMP processing accelerator, and a CMP passivating agent.

16. The CMP slurry composition of claim 7, wherein the polymer core includes an inorganic material that is different in composition from the metal oxide.

17. A CMP polishing pad comprising metal oxide-polymer composite particles that include a plurality of metal oxide particles and a polymer core, wherein:
the metal oxide particles are modified with a bifunctional modifying agent, and
at least a portion of the metal oxide particles are partially embedded within the polymer core and project out from the polymer core.

18. The CMP polishing pad of claim 17, wherein the metal oxide particles are modified with a modifying agent via which the metal oxide particles are covalently attached to the polymer in the polymer core.

19. The CMP polishing pad of claim 17, wherein the metal oxide-polymer composite particles further include one or more ingredients selected from the group consisting of a CMP chemical etchant, a CMP processing accelerator, and a CMP passivating agent.

20. A metal oxide-polymer composite particle comprising:
a plurality of metal oxide particles;
a polymer core, the metal oxide particles being modified with a modifying agent via which the metal oxide particles are covalently attached to the polymer in the polymer core; and
one or more ingredients selected from the group consisting of a CMP chemical etchant, a CMP processing accelerator, and a CMP passivating agent,
wherein at least a portion of the metal oxide particles are partially embedded within the polymer core and project out from the polymer core.

21. The metal oxide-polymer composite particle of claim 20, wherein a portion of the metal oxide particles are fully embedded within the polymer core.

22. The CMP slurry composition of claim 7, wherein a portion of the metal oxide particles are fully embedded within the polymer core.

23. The CMP polishing pad of claim 17, wherein a portion of the metal oxide particles are fully embedded within the polymer core.

* * * * *